United States Patent
Bronstein et al.

(10) Patent No.: US 8,442,384 B2
(45) Date of Patent: May 14, 2013

(54) METHOD AND APPARATUS FOR VIDEO DIGEST GENERATION

(76) Inventors: Michael Bronstein, Santa Clara, CA (US); Alexander Bronstein, San Jose, CA (US); Shlomo Selim Rakib, Cupertino, CA (US); Asaf Matatyaou, San Carlos, CA (US)

(*) Notice: Subject to any disclaimer, the term of this patent is extended or adjusted under 35 U.S.C. 154(b) by 1047 days.

(21) Appl. No.: 12/174,558

(22) Filed: Jul. 16, 2008

(65) Prior Publication Data

US 2009/0022472 A1 Jan. 22, 2009

Related U.S. Application Data

(63) Continuation-in-part of application No. 11/778,633, filed on Jul. 16, 2007, now Pat. No. 8,224,087.

(51) Int. Cl.
*H04N 5/93* (2006.01)

(52) U.S. Cl.
USPC .............................. 386/278; 386/288; 725/46

(58) Field of Classification Search ...... 386/278; 725/46
See application file for complete search history.

(56) References Cited

U.S. PATENT DOCUMENTS

| | | | | |
|---|---|---|---|---|
| 5,818,439 A | * | 10/1998 | Nagasaka et al. | 725/87 |
| 7,082,102 B1 | | 7/2006 | Wright | |
| 7,302,113 B2 | * | 11/2007 | Pilu et al. | 382/276 |
| 2002/0157095 A1 | * | 10/2002 | Masumitsu et al. | 725/46 |
| 2005/0232588 A1 | | 10/2005 | Hosoda et al. | |
| 2008/0132257 A1 | * | 6/2008 | Fok et al. | 455/466 |
| 2009/0083781 A1 | * | 3/2009 | Yang et al. | 725/20 |

OTHER PUBLICATIONS

Xian-Sheng Hua, Lie Lu ; Hong-Jiang Zhang , Optimization-based automated home video editing system , May 2004, IEEE,vol. 14 , Issue: 5 pp. 572-583.*

CM Taskiran, Z Pizlo, A Amir, Automated video program summarization using speech transcripts IEEE Transactions on, 2006—ieeexplore.ieee.org,vol. 8 , Issue: 4 pp. 775-791.*

* cited by examiner

*Primary Examiner* — Oscar Louie
*Assistant Examiner* — Ali Shayanfar
(74) *Attorney, Agent, or Firm* — Stephen E. Zweig

(57) ABSTRACT

Automated video digest system and method. The system decomposes video and audio portions of video media into low-level descriptors, producing a large number of such descriptors for each video image and scene. These descriptors are optimized to be both compatible with rapid automated descriptor creation, and also to have some positive or negative statistical correlation with the viewing preferences of typical human viewers. By comparing the number of descriptors correlated with positive human viewing preferences, versus the number of descriptors correlated with negative human viewing preferences, the automated system may analyze an unknown video program and make educated guesses as to which portions of the program are likely to be most interesting to the viewer on playback. Less interesting portions may be skipped or fast-forwarded though. The method may also be optimized to individual viewers. Such methods are useful for controlling the playback of digital video recorders and other systems.

49 Claims, 20 Drawing Sheets

ABBREVIATION

SUMMARY

FAST FORWARD (PREVIEW)

METHOD AND APPARATUS FOR VIDEO DIGEST GENERATION

This application is a continuation in part of, and claims the priority benefit of, U.S. patent application Ser. No. 11/778,633, "Method and Apparatus for Video Digest Generation", filed Jul. 16, 2007. The contents of this disclosure are included herein by reference.

FIELD OF THE INVENTION

The invention pertains generally to storing, retrieving and displaying media information. More particularly, the invention relates to methods and apparatus for processing video and audio content so that undesired content is discarded, and only desired content is retained.

BACKGROUND OF THE INVENTION

Digital video recorders (DVR) allow a convenient and flexible way of storing and retrieving video and audio information accessible to the modern user of media content. Today, the majority of video content is coming from cable or satellite providers, or archived on different media. However, the rapid development of broadband networks has increased the percentage of content coming from the Internet, peer-to-peer sharing, etc. These trends blur the traditional concept of channels and we therefore refer to the possible sources of video as the "ocean of content".

Storing and retrieving important content from this ocean is becoming a problem. Given the large choice of content, the user has problems choosing what he wants to see. Assuming that a typical DVR may store hours of video, a typical, modern user, who has limited time, is unable to see even a small fraction of the data he would like to see. Modem DVRs have some basic capabilities facilitating the preview and retrieval of recorder content, but they are too limited and generic to be convenient.

Viewers of video typically desire the ability to see certain portions of a program that are significant to them (i.e., desired content). It should be understood that for a single content, multiple different video digests may be created, depending upon the definition of desired and undesired content. Since such definitions are subjective, ideally, a video digest is custom tailored for every user.

Theoretically, desired and undesired content may be given a semantic description. For example, one may wish to adjust a DVR processor to analyze the video and automatically store or play back scenes of car crashes and automatically fail to store or play back (exclude) advertisements. Here "Car crashes" and "advertisements" are high-level, human recognizable, semantic labels to the aforementioned classes of video content. Automatically matching high-level and human understandable semantic description to lower level video content that may be automatically handled by one or more processors belongs to the general category of pattern recognition problems, usually referred to as video search.

Unfortunately, prior art methods did not teach unique and reliable ways to relate high-level semantic description to the actual video content in a way that would be particularly useful for typical video viewers. Video viewers usually prefer a zero-effort experience, in which no explicit interaction with the system is needed. By contrast, using prior art methods, a substantial amount of user effort was required in order to link a high-level user semantic description of wanted or unwanted video to particular to video patterns that might be handled and recognized by automated video recognition equipment.

BRIEF DESCRIPTION OF THE DRAWINGS

The drawings show embodiments and examples of configurations embodying the invention. None are intended to limit the invention, but merely to illustrate examples of implementation and define related concepts. The invention is limited only to the claims, both appended and future, and all equivalents.

DETAILED DESCRIPTION OF THE PREFERRED EMBODIMENTS

Figure 1:
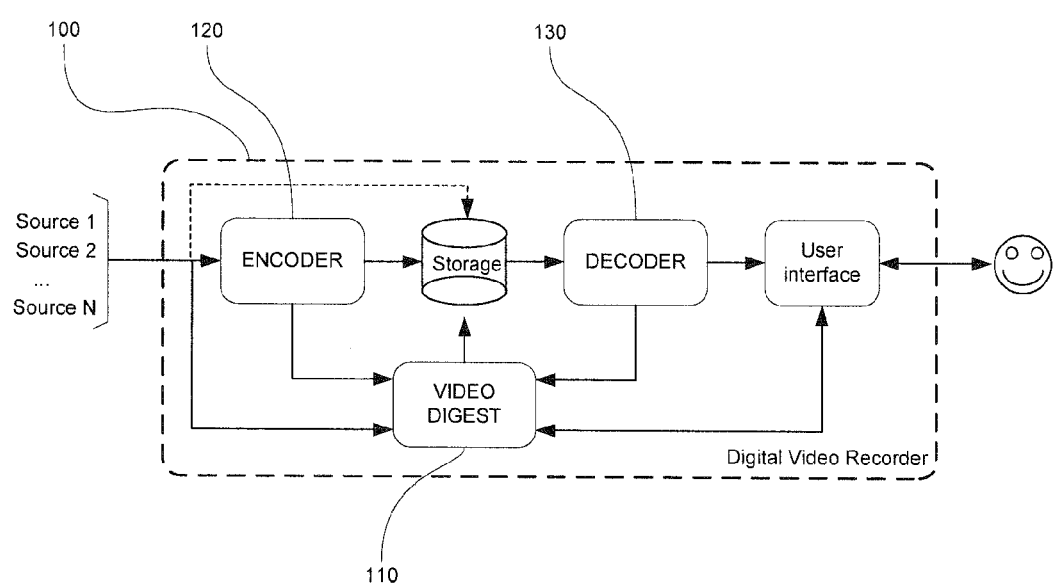
FIG. 1 is a conceptual block diagram of an embodiment of a DVR integrated with a video digest system configured according to the invention.

The invention is directed to a novel method, apparatus and system for to automatically or semi-automatically assess video information (and associated audio information) as to probable viewer interest (i.e. "significant" vs. "insignificant") and use this assessment to control how video is stored and/or played back to the viewer. In one embodiment, the invention relates to methods, devices and systems for processing media content so that insignificant content is discarded, and only significant content is retained.

In one example embodying the invention, a digital video recorder system is provided for storage and/or playback of media content. The system may include at least one video processor capable of analyzing input media content and automatically generating descriptors that are associated with the image and/or audio contents of various time portions of the input media content. At least one sensor is included to detect and record user viewing preferences while the input media content is being played. Persistent memory is capable of storing a persistent database that correlates the descriptors with the recorded user viewing preferences. For system control, at least one control processor, and associated control software is included. The control processor operates under the control of the control software, and controls the storage and/or playback of various time portions of a previously unanalyzed input media content (unknown media content). This is done by first sending the unknown media content to the video processor, and directing the video processor to generate descriptors of the video and or audio portion of various time portions of the unknown media content (unknown video descriptors). Then, the processor uses the unknown video descriptors as an index to the persistent database, and retrieves the user viewing preferences associated with the unknown video descriptors. Next, an estimated user preference is constructed of the various time portions of the unknown media content by using the retrieved user viewing preferences and a suitable weighing function. The processor then uses this estimated user preference to control the storage and/or playback of various time portions of the unknown media content.

Other embodiments of the invention are described herein for purposes of describing the invention in various contexts.

In one embodiment, the video processor and the control processor may be the same processor and the video processor is capable of compressing and/or decompressing a lossy or lossless video codec. Alternatively, the video processor and the control processor are different processors, and in which the video processor is optimized for generating the descriptors.

The descriptors may be selected from a population of descriptors known to have a positive or negative statistical correlation with user preferences.

Alternatively, the descriptors that are associated with the image contents of various time portions of the input media content may be the result of applying mathematical processing to a subset of media content selected from the group consisting of three dimensional blocks of pixels, three dimensional edges, spatio-temporal regions with consistent motion, a priori objects, and collections of simple features.

Alternatively, the descriptors that are associated with the image contents of various time portions of the input media content are further optimized to detect action, conversation, cartoons, outdoor scenes, and text over video.

Alternatively, the descriptors that are associated with the audio contents of various portions of the input media content are the result of applying mathematical processing to a subset of media content selected from the group consisting of functions that analyze sound frequency range, sound energy versus frequency range, voice frequency range, music frequency range, word recognition, and language recognition.

The descriptors that are associated with the image contents of various time portions of the input media content may be produced from image feature recognition algorithms selected from the group consisting of the Viola-Jones algorithm, the Rowley-Baluja-Kanade algorithm, the Schneiderman-Kanade algorithm, the Roth-Yang-Ahuja algorithm, and the Chum algorithm, and possibly other algorithms.

The database may contain both descriptors associated with positive viewer preference, and descriptors associated with negative viewer preference, and the suitable weighting function may contain a subtraction operation that subtracts the negative viewer preference from the positive viewer preference.

The system memory and/or database may be supplemented with a supplemental database of other video descriptors and user preferences obtained from a plurality of other systems, other media content, and other users. The database may or may not be a relational database.

One or more sensors may be included to detect and record user viewing preferences detect information selected from the group consisting of: video that the user plays at normal speed, video that the user skips past, video that the user plays at high speed, video that the user designates as preferred, video that the user designates as not preferred, video that image sensors on the system indicate is playing to an audience, video that image sensors indicate is not playing to an audience, video that image and sound sensors indicate is playing to an interested audience, and video that image and sound sensors indicate is playing to a non-interested audience.

The system may be configured to compress video to fit within a designated time duration that is shorter than the length of the video by choosing the input video time portions associated with the highest user preference, and not choosing the input video time portions associated with lower user preference, so as to cause the input video to be played back within the designated time duration.

The system may be capable of distinguishing between different users, and the associated control software may control a media content based upon an individual user's profile of viewing preferences or history of viewing preferences.

The system may further compute one or more video signatures that identify the overall appearance of the various time portions of the unknown media content (overall video identifiers); correlate these overall video identifiers with overall user viewing preferences, and also stores this data in the persistent database. In such a system, the control processor and/or the video processor, under control of the control software, may further control the storage and/or playback of various time portions of a previously unanalyzed input media content (unknown media content). This may be done by first generating video signatures of the various time portions of the unknown media content (overall video identifiers). Then, using the overall video identifiers as an index to the persistent database, retrieving the overall user viewing preferences associated with the overall video identifiers. The overall user viewing preferences and the estimated user preference may be used as input into a master user preference function. This master user preference function may be used to control the storage and playback of various time portions of the unknown media content.

The video signature is computed by a hash function or video DNA creation algorithm.

The master user preference function allows the overall user viewing preference to override the estimated user preference.

One embodiment of the invention is configured to operate by decomposing video and audio portions of video media into a substantial number of low-level descriptors for each video image and scene. These descriptors are optimized to be both compatible with rapid automated descriptor creation, and also to have some positive or negative statistical correlation with the viewing preferences of typical human viewers (termed viewers or users). In general, any non-zero statistical correlation with viewing preferences may be adequate, but in some embodiments, more stringent criteria that the statistical correlation be statistically significant may be particularly useful.

For example, viewers often prefer video scenes with faces, and thus face recognition descriptors usually have a positive statistical correlation with viewing preferences. By contrast, viewers usually do not like to watch screens filled with text over video, since such scenes are usually associated with uninteresting movie credits or advertisements. Such text-over-graphics descriptors usually have a negative statistical correlation with viewing preferences.

Individual viewers may have differing video viewing preferences. For example, a viewer mainly interested in talk shows may have a negative preference for music sounds, and a positive preference for speech sounds. By contrast, an average viewer may have no such negative preference for music. As another example, some viewers prefer mostly action and little dialog, and thus have a negative preference for scenes that contain mostly stationary content.

By comparing the number of descriptors correlated with positive viewing preferences, versus the number of descriptors correlated with negative viewing preferences, the automated system may analyze an unknown video program and make educated guesses as to which portions of the program are likely to be most interesting to the viewer on playback. The system may then skip or fast-forward through the video portions that it estimates may be less interesting to the viewer. The method may be optimized to individual viewers. The invention may thus be used for a wide variety of different video storage and playback devices, and is particularly useful for controlling the playback of personal video recorders (PVR) and digital video recorders (DVR).

From a system point of view, the invention may contain a combination of hardware and software. As one example, the system may exist as a component or subsystem of a Digital Video Recorder (DVR). In this format, the invention may analyze the video content stored and played back by the DVR, and extract and show only the portions of the video content that the system estimates are most meaningful or important for the user.

Although typical uses for the invention are to analyze video programs or media consisting of both audio and video content, the invention may also be used to analyze silent programs (just video content), audio programs (just audio content), or other material. Thus to generalize, this range of material is referred to here as "media content".

One embodiment of this combination of hardware and software is illustrated in FIG. 1 as a video digest generator (110), and is shown integrated into a DVR (100). DVRs contain video encoding and decoding engines that, for example, translate between highly compressed digital video (often in MPEG-2 or MPEG-4 format) used for video storage and transmission, and the uncompressed video stream that is then sent to a monitor for actual viewing. In this sort of situation, the video digest generator (110) may be included as either a separate component, or it may be included as an upgraded version of the compressed video encoding (120)/decoding (130) engine that exists in almost all DVRs. Alternatively the video digest system may exist as a separate device that operates in conjunction with a DVR. The video digest invention may also be used independent of a DVR. For example, it could be coupled with a video camera, and used to automatically determine when to transmit video, and when not to.

Generally, the video digest generator (110) may be defined as the hardware and software combination that provides the video digest functionality described herein. When run on general purpose processors that lack specific video functionality and commands, nearly all of the video digest generator may be required to consist of a series of software algorithms, usually written in languages such as C, C++, assembly, or other computer programming language, that direct the general purpose processor to perform the various algorithms discussed in this specification. When run on more specialized or sophisticated processors that contain specific video functionality and commands, where suitable, certain portions of the various video digest generator may be offloaded from software section and run in hardware. Often this may be advantageous because specialized hardware implementation may often be faster than a pure software implementation.

For example, the processor may include a descriptor generator configured to receive the unknown video program and to generate descriptors of the video and or audio portion of various time portions of the unknown video program (unknown video descriptors). This can be implemented by various means, including pure software (running on a general purpose processor), software embedded into the processor, microcode, and dedicated hardware circuitry on the processor, or dedicated hardware circuitry located outside the processor.

As another example, the processor may include an index unit configured to utilize unknown video descriptors as an index to the persistent database to retrieve user viewing preferences associated with the unknown video descriptors. This too can be implemented by various means, including pure software (running on a general purpose processor), software embedded into the processor, microcode, and dedicated hardware circuitry on the processor, or dedicated hardware circuitry located outside the processor.

As still another example, the processor may include a preference constructor configured to construct an estimated user preference of the various time portions of the unknown video program by using the retrieved user viewing preferences and a suitable weighing function. This too can be implemented by various means, including pure software (running on a general purpose processor), software embedded into the processor, microcode, and dedicated hardware circuitry on the processor, or dedicated hardware circuitry located outside the processor.

Thus the video digest generator (110) may be implemented by software, or a hardware-software combination, that runs on a single processor or microcontroller, or a combination of processors, microcontrollers, application specific integrated circuits, memory and storage devices, necessary for analyzing the video (and optionally the audio) signal. These processors and microcontrollers may include processors (or microcontrollers) compatible with the ARM, MIPS, X86, Alpha, Power-PC, instruction sets and other instruction sets. For many applications, use of video processing optimized digital signal processors (DSP) may also be desirable, and this DSP may be packaged with the processor in a system on chip (SoC) format as desired. The processor may be a multiple function processor, and contain a subsystem that has video codec functionality capable of compressing and decompressing digital video. In this case, in some embodiments, the video digest generator may make use of certain intermediate data created by the video codec subsystem, such as motion detection of certain video portions, in order to facilitate certain video digest operations. Suitable video codec processor functionality includes lossy codecs such as MPEG-1, MPEG-2, MPEG-4, MPEG-10, MPEG-4 (Advanced Simple Profile), H.264, Blackbird, Cinepak, Indeo 3/4/5, MJPEG, Sorenson 3, Microsoft Windows Media Video (WMV), RealVideo, and other lossy codecs. Lossless video codecs, such as CorePNG, Huffyuv, Lagarith, LCL, SheerVideo, etc. may also be used.

The video digest generator (110) may also often contain its software programs stored in persistent memory, such as Flash, ROM, or battery backed up RAM memory. The digest generator may often also contain sufficient random access memory, such as RAM, to hold at least portions of the video images and portions of the intermediate calculations used in the video digest process.

As previously discussed, in some embodiments, portions of the video processing required for the digest generation may rely upon the information produced by the video codec and performed during the video encoding or transcoding process (while the content is being stored in the DVR) or during the video decoding process (while the stored content is being played). This has an advantage in terms of computational complexity, since some computationally-intensive processes that are already performed during video encoding or decoding (such as motion detection) may be thus reused for the purpose of video digest generation, avoiding redundant computations.

Video Digest Generation Process

The video digest generator is designed to automatically process video contents and generate metadata that gives information as to user viewing preferences, which in turn may be used to control DVRs and other systems.

Figure 2:
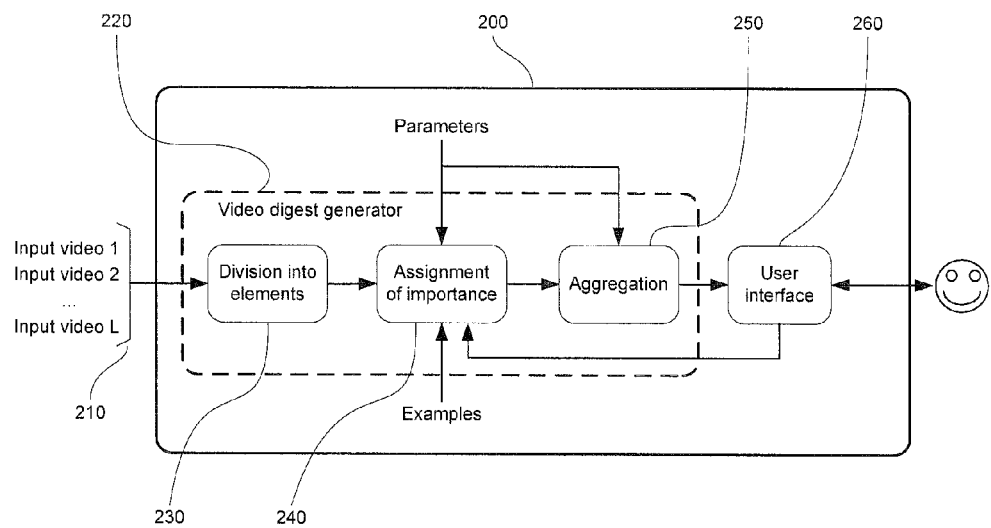
FIG. 2 is a conceptual block diagram of one embodiment of a video digest generator configured according to the invention.

In FIG. 2, system (200) shows the main stages of the video digest generation process. The input (210) automatically fed into a video digest generator (220) may be either single or multiple video inputs and sequences. In the following discussion, the case of single video input is described. However multiple inputs may also be used by the use of standard switching equipment, and or use of extra processing equipment. Thus generalization to multiple inputs is readily apparent to those of ordinary skill in the art, and should be included in the spirit of the invention.

As a matter of notation, the video is denoted by I(x, y, t), where x, y are the horizontal and vertical spatial coordinates, and t is the temporal coordinate. For a fixed value of t, I(x, y, t) may be thought of as a two-dimensional matrix of pixels, referred to as a "frame", which essentially corresponds to a standard video image frame. Spatial coordinates refer to the position within the frame. Temporal coordinate refers to the time axis, which in turn is usually related to the video frame number. For example, assuming that the video is recorded at 30 frames per second, a t of one second may often relate to video frame 30, and so on.

The video digest generation process consists of the following stages: division into video elements stage (230), assignment of importance rating stage (240), aggregation into video aggregates stage (250). The operation of these stages may be guided and made more relevant to a particular user's preference ratings by interaction with the user, through the user interface (260).

Division into Video Elements

Figure 3:
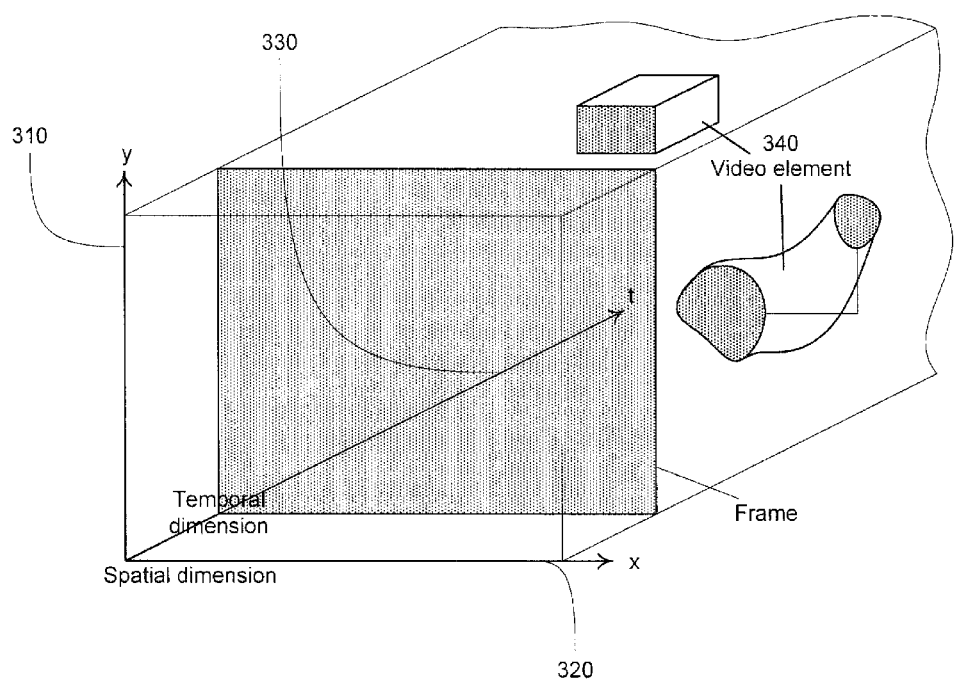
FIG. 3 shows examples of video elements

During the division stage (230), each video sequence is divided into video elements. As shown in FIG. 3, a video element (340) is defined as a 3-dimensional spatial-temporal subset of the video I(x, y, t) i.e., a continuous group of pixels within a few subsequent frames. This is essentially a mathematical abstraction of a very short video clip, where the x and y dimensions are allocated to the 2-D video image (i.e. a video image frame), and t is the time component of the image. Usually t will have a granularity that is proportional to the number of video image frames per second. Typical values here range from 15 frames per second (somewhat jerky low-end video), to 24 frames per second (movie speed), 30 frames per second (progressive scan video), 60 frames per second (interlaced scan video), and so on.

Humans usually need a fraction of a second to notice portions of images. Here, the video digest process may be facilitated by somewhat arbitrarily setting boundaries that, instead of analyzing at just the individual video frame level, instead extend the analysis to images that persist for multiple frames. At a minimum, at least three temporally associated image frames may be used for each video element analysis. More commonly, approximately ten or more associated image frames may form the lower bound for this analysis. The video image frames may be contiguous, i.e. one following the other in time with no frames in between, or alternatively, may be semi-contiguous (i.e. use every other frame, every third frame).

Often it is useful to set the minimum amount of time "t" or number of frames at a lower cutoff of about ⅓ second, which would be at about 10 frames assuming that the video is shot at 30 frames per second. The maximum amount of time or number of frames for an upper cutoff is somewhat arbitrary, and may differ according to the hardware capability of the video analysis equipment, the program material (rapidly changing versus static), and user preferences. Although often it may be useful to somewhat arbitrarily use an upper value of a few (3-5) seconds as an upper limit, other values, such as 15-30 seconds (often the length of credits or a short commercial), a few minutes, or even longer may be appropriate in some situations.

It is possible for the time coordinates of different video elements to overlap each other, depending on their locations and sizes. FIG. 3 shows these three dimensions: spatial x axis (320), spatial y axis (310), and temporal t axis (330). Visually, each generic video element (340) may be thought of, and represented as, a "snake" or "tube", in which spatially continuous pixels in different individual frames are combined together. The most generic video element is a contiguous spatio-temporally subset of the video with coherent properties.

For example, consider a scene where the video looks at a square painting hanging on the wall for a few seconds. If the automated video element detector is set to lock on and detect the square painting as a whole, the "snake" or "tube" that corresponds to this video element will look like a box with the first video frame of the square painting at one end, the last video frame of the square painting at the other end, and in the middle the sides are the boundaries of the square painting in all of the intermediate video frames (or time coordinates). If the camera position moves relative to the square painting, then the "snake" or "tube" will have curves or kinks since the position of the square painting in the intermediate video frames (or time intervals) will differ. If the camera pulls away from the square painting, the end of the "snake" or "tube" will be smaller than the beginning because the area (number of pixels) now occupied by the square painting in the image will appear smaller.

For some types of video elements, it is occasionally useful to set arbitrary constraints on the video element analysis system so that those elements (340) which are too short or too long (in the temporal duration), or too small or too large (in the spatial size) are discarded. From the user preference standpoint, these constraints are reasonable, because user attention will usually not be influenced by individual image elements that are either extremely short duration or occupy a very small portion of the image. There are exceptions to this "too small" rule, however. In the case of text, for example, the individual video elements may be quite small in terms of pixel size. However if there are too many text video elements, viewer attention (preference) will tend to be less. Thus to cope with this situation, the viewer attention contributions of a large number of such small elements should be summed up in order to produce a net overall viewer attention (or interest) estimate.

On the other end of the size and time spectrum, user attention will often not be influenced by individual elements, such as the sky, the ocean, land masses, room walls, etc., that are physically very large or persist for long periods of time. To cope with many types of video elements, in addition to temporal constraints, a video element (340) algorithm may be directed to reject certain types of elements with spatial dimensions smaller than 5% and not exceeding 50% of the frame size. In practice, this cutoff limit may vary depending upon the actual video analysis algorithms used, program type, and user preference. Often it is useful to look at both large and small elements.

There are a large number of different analytical methods to describe various portions of the video, and partition the video into video elements (340). Many of these analytical methods may produce video elements that do not have any statistically meaningful correlation with viewer preferences. Thus it is important to select video element descriptors from a population of descriptors that are either known or suspected of having a positive or negative statistical correlation with user preferences. Generally the more statistically significant this correlation is, the better.

Determining which specific analytical methods, video elements and element descriptors are most likely to correlate with viewer preference or interest is complex, and here experimental methods may be useful. One good method is to monitor a relatively large (i.e. 100 or more) and randomly selected population of viewers (who are watching a broad variety of video) for a period of time, ideally weeks or more, while this population of viewers controls DVRs and makes a large number of decisions as to what material is interesting, and what material is uninteresting. This information may be stored in a first viewer preference database.

Next, the specific video media that the various viewers were exposed to may be analyzed and decomposed into a large (ideally thousands or more) number of different candidate video elements. This large number of different candidate video elements may be stored in a second video element database.

Finally, the first viewer preference and second video element database may be analyzed by a statistical correlation analysis, and those candidate video elements and combinations of elements which have demonstrated a positive or negative statistical correlation with average viewer preferences that exceeds a predetermined threshold (such as statistical significance) may be selected and used to generate an initial basis set or "factory set" of standard video user preference elements for the system. As will be discussed shortly, this "standard" or "factory" setting then may be supplemented by additional local settings that take into account local viewer preferences.

In a few cases, the correlation between a particular video element and viewer preferences is relatively direct and easy to understand (intuitive). For simplicity and ease of reading, a number of the video elements examples discussed in this invention will use this relatively direct and intuitive correlation. However in most cases, the correlation between particular video elements and viewer preferences may not be at all direct or easy to understand. Rather, these correlations will only attain useful meaning when the user attention prediction from a large number of different video elements is combined.

Here, a few examples of defining such video elements are given below for illustration purposes.

The simplest example of a video element (340) is a three-dimensional block of pixels of the form I(x, y, t), where $M_1 <= x <= M_2$, $N_1 <= y <= N_2$ and $T_1 <= t <= T_2$.

Another way to detect video elements (340) is as the spatio-temporal boundaries of I(x, y, t). Such boundaries represent places in the video in which abrupt changes occur either in the spatial or the temporal dimensions. The interior of the spatio-temporal boundary may be associated with an object present in the video along time. Boundary detection is possible using a three-dimensional edge detector. As an example of an edge detector, the norm of the three-dimensional gradient may be used, e.g.:

$$E(x,y,t) = I_x^2(x,y,t) + I_y^2(x,y,t) + I_t^2(x,y,t)$$

or $$E(x,y,t) = |I_x(x,y,t)| + |I_y(x,y,t)| + |I_t(x,y,t)|$$

where $I_x$, $I_y$, $I_t$ denote the discrete derivatives of I with respect to x, y and t. Other edge detectors common in literature may be employed as well.

Video implies movement, and here the complicating effects of movement must be factored into the video element analysis. In many cases, objects of potential viewer interest (or disinterest) in video are moving objects. Since the video element analysis is based upon multiple frames, the automated video analysis algorithms need to have a way to automatically recognize that a group of pixels in location 1 in frame 1 is related to the group of pixels in location 2 in frame 2.

One good way to do this is to detect these moving but related video elements (340) as spatio-temporal regions with consistent motion. Here standard spatio-temporal segmentation methods, such as the methods of Feldman and Weinshall (D. Feldman and D. Weinshall, "*Motion segmentation using an occlusion detector*" *IEEE Transactions on Pattern Analysis and Machine Intelligence*, 30 (7), July 2008, pp 1171-1185), or similar methods, may be used.

According to the Feldman and Weinshall approach, described for illustration purposes in several steps as follows, each video frame may be thought of as an instantaneous two-dimensional depiction of moving three-dimensional objects. While moving, foreground objects cover and uncover background objects. Thus, pixels belonging to foreground objects in consecutive frames may be obtained by motion compensation, while pixels of background objects usually cannot. Detecting such pixels may serve as an indication of regions with coherent motion.

Figure 4:
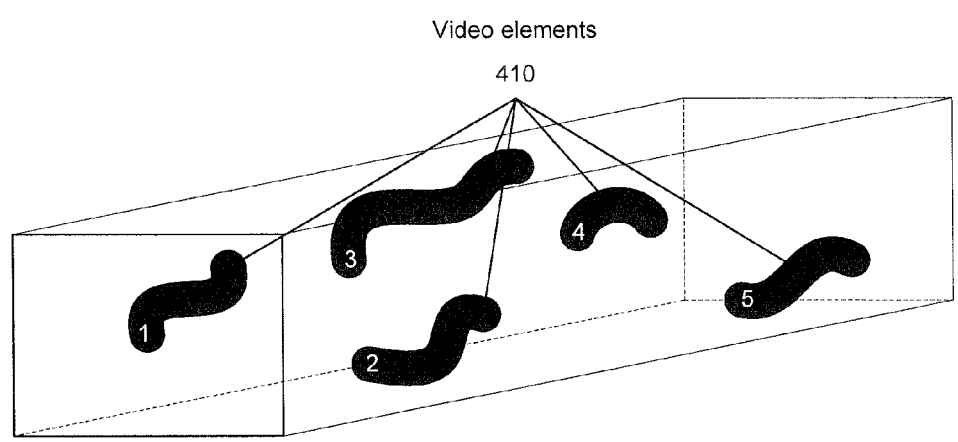
FIG. 4 shows the first stage of video digest generation: division stage.

A spatial neighborhood N(x,y) of a pixel I(x,y,t) has coherent motion if there exists a vector $(v_x, v_y)$ such that $I(x,y,t+dt) = I(x+vx, y+vy, t)$ for all x,y in N(x,y). The boundaries of such regions may be detected by employing an occlusion detector, which indicates for every pixel I(x, y, t) whether it may be obtained as the result of a displacement from previous frames. Feldman and Weinshall solve this problem by computing the minimum eigenvalue of the spatio-temporal structure tensor, represented at each pixel by the 3×3 symmetric matrix $$G = \sum_{(x,y) \in N(x,y)} \begin{bmatrix} I_x^2 & I_x I_y & I_x I_t \\ I_x I_y & I_y^2 & I_y I_t \\ I_x I_t & I_y I_t & I_t^2 \end{bmatrix}$$

where $I_x$, $I_y$, and $I_t$ denote the discrete derivatives of I with respect to x, y and t. The spatio-temp oral structure tensor serves as an indicator of regions with coherent motion and texture (e.g., corresponding to objects moving in time); a standard segmentation algorithm is then applied to create a binary map for each pixel, determining whether it belongs to a coherent region or not. Each pixel is then assigned and labeled a value/index (410) to indicate which video element (340) it belongs to, as shown in FIG. 4.

An alternative method to detect regions with consistent motion is by using motion vector information from a video decoder (130) or encoder (120), such as an MPEG-2 decoder or encoder, MPEG-4, decoder or encoder, or the like that outputs motion vectors during the decoding or encoding process. This method is often readily available, since the input video stream usually comes in a compressed form and usually undergoes decoding in the DVR. Thus this side motion information from the video codec is usually readily available. Here consistent motion in a region is indicated by approximately equal motion vectors. Pixels at which occlusions occur are at the boundaries of consistent motion regions, and are typically indicated by high prediction error, which, in turn, results in a large number of texture bits. The number of texture bits may be used to infer the boundaries of consistent motion regions.

Another way to detect video elements (340) is by detection of continuously appearing objects, with properties known a priori, in consecutive frames. This may be done either after the objects have been shown to be moving as a group, or (for relatively static objects) may be done without first determining that the objects are moving as a group.

Pixel group motion detection methods allow us to define the "snake", "worm" or "tube" "swept out by a moving object in a video. For example, a moving letter "P" would create a "tube" or that, in cross section, looks like a "P" (see FIG. 18). A moving face creates a "tube" that in cross section looks like a face, and so on.

Once the groups of pixels that move in time as a unit are determined, the next step is to analyze the "tube" swept out by this group of pixels, and automatically compute if the tube contains useful video elements. Here "useful" video elements are video elements that are statistically linked to viewer preferences, and may be used to help predict overall viewer interest or disinterest in this portion of the video.

As previously discussed, in some cases, the correlation between a video element and viewer interest will make sense, at least after the correlation has been found and analyzed. That is, it is easier to understand the link between human faces, body parts, nudity, texture patterns, and text and viewer interest. More typically, however, the correlation will be unexpected, and be found only by computer statistical analysis of large databases correlating video elements and viewer interest.

There are a number of automated methods to automatically recognize and classify such video elements. One suitable method is the object detection algorithm described in P. Viola, M. Jones, "*Rapid object detection using a boosted cascade of simple features*" *Proceedings of the* 2001 *IEEE Computer Society Conference on Computer Vision and Pattern Recognition,* 1 pages I-511 to I-518.

The Viola and Jones detector may be "trained" to recognize many different types of video elements. Essentially the detector is first trained to recognize a particular element by being fed a large number of images as positive and negative examples. A positive image will contain the particular element of interest, and a negative image will not. The Viola and Jones method then computes coefficients and algorithms that allow the method to detect the element of interest in an unknown image or video.

This algorithm, called the AdaBoost algorithm for classifier learning, is discussed in table 1 of the above paper. It may be trained to recognize many different types of objects. As one example, the Viola and Jones detector may be trained, using a large number of positive and negative examples of images with faces, to recognize the characteristics of the average human faces, and pick them out of images. The AdaBoost algorithm works as follows:

Given example images $(x_1, y_1), \ldots (x_n, y_n)$, where $y_i=0, 1$ for negative and positive examples respectively:

Initialize weights $$w_{1,i} = \frac{1}{2m}, \frac{1}{2l}$$

for $y_i=0, 1$ respectively, where m and l are the number of negatives and positives respectively.

For t=1, ..., T:
  1. Normalize the weights $$w_{t,i} \leftarrow \frac{w_{t,i}}{\sum_{j=1}^{n} w_{t,j}}$$

so that $w_t$ is a probability distribution.
  2. For each feature, j, train a classifier $h_j$ which is restricted to using a single feature. The error is evaluated with respect to $w_t$, $$\varepsilon_j = \sum_i w_i |h_j(x_i) - y_i|.$$

3. Choose the classifier, $h_t$, with the lowest error $\epsilon_t$.
  4. Up date the weights: $W_{t+1,i} = w_{t,i} \beta_t^{1-e_i}$ where $e_i=0$ if example $x_i$ is classified correctly, $e_i=1$ otherwise, and $$\beta_t = \frac{\varepsilon_t}{1 - \varepsilon_t}.$$

The final strong classifier is:

$$h(x) = 1 \text{ if } \sum_{t=1}^{T} \alpha_t h_t(x) \geq \frac{1}{2} \sum_{t=1}^{T} \alpha_t,$$

and 0 otherwise, where $$\alpha_t = \log \frac{1}{\beta_t}$$

This method may then be used to select and train a series of useful feature classifiers that may then be used in an attentional cascade to detect features. Here, as taught by Viola and Jones, the face detection algorithm may proceed efficiently by subjecting the image to a series of classifiers, where a positive result by a first classifier triggers further evaluation by a second classifier, a positive result by a second classifier triggers further evaluation by a third classifier, and so on. Often a complete detection cascade may require on the order of 38 stages, and over 6000 features. However with modern processors, in particular dedicated processors, such detection may proceed both very rapidly and very accurately.

The method works quite well for recognizing human faces, and may be trained to recognize many other types of features as well. Thus in one scheme, a large number of different Viola and Jones detectors may be trained to recognize a large number (hundreds, thousands or more) of different possible features. These various features may then be tested for potential correlation with average viewer interest versus the large viewer preference database discussed previously, and those that that show either positive or negative correlation with viewer preferences may then be selected as the factory installed basic set of analysis options on the system.

Many other types of image feature recognition algorithms may be used here. In general, most image recognition algorithms may be utilized in a system configured according to the invention. Other useful algorithms include the Rowley-Baluja-Kanade algorithm, the Schneiderman-Kanade algorithm, the Roth-Yang-Ahuja algorithm, and many others.

Another generic algorithm that can be adapted for recognizing different types of video elements is described in Chum, O., Philbin, J., Sivic, J., Isard, M and Zisserman, A. "Total Recall: Automatic Query Expansion with a Generative Feature Model for Object Retrieval", Proceedings of the 11th International Conference on Computer Vision, Rio de Janeiro, Brazil (2007).

Using the Chum algorithm, multi-scale Hessian interest points are determined for each image, and these are fit to an affine invariant region using a semi-local second moment matrix. For each of these affine regions, a 128-dimensional SIFT (scale invariant feature transform) descriptor is computed. This is then quantized using a million word visual vocabulary generated by an approximate K-means clustering method and randomized trees. Each visual descriptor is then assigned by approximate nearest neighbor search to a single cluster center. These quantized visual features may then be used to index the images for various objects or video elements.

User Customization

It should be recognized that there are different types of video viewers, and these different types of video viewers may have different viewing preferences. For example, there are:
  Action preference viewers
  Conversation preference viewers
  Cartoon preference viewers
  Outdoor preference viewers
  Text over video dislike Viewer interest may be influenced by sound as well, and here again, different viewers may have different likes and dislikes for certain sound types. For example, there exist viewers with differing:
  Sound spectral change dislike
  Music like or dislike
  Conversation like or dislike
  Violent (i.e. gunshot, or other percussion like sound) sounds like or dislike Action preference viewers typically prefer video scenes with rapidly changing image content. Such content is often associated with music.

Conversation viewers typically prefer video scenes with recognizable faces and mouths, and relatively slow varying image content. Such content is often associated with human speech frequencies.

Cartoon viewers typically prefer low-complexity video scenes. This is because cartoons often consist of line drawings surrounding areas with relatively uniform coloration.

Outdoor preference viewers typically prefer video scenes with distinguishing features such as an enriched blue (sky) component in the upper portion of the image, areas with unusual green content, increased specular content (caused by sunlight), and relatively harsh shadows (again caused by sunlight).

Text over video dislike: Text over video is often associated with undesirable content, such as subtitles, credits, and advertisements. Text over video may be distinguished from text in a video scene in that text in a video scene will tend to be fuzzier and unevenly illuminated. By contrast, text over video is typically crisp and usually evenly illuminated. Users may usually tolerate a limited amount of text, but when this level gets too high, it may not appreciated.

As will be discussed herein, the invention may also track a user's viewing preferences over time, analyze these preferences, and progressively adapt to become more accurate at predicting an individual viewer's preference. A system using this invention may also keep track of multiple viewers, maintain a file or database of each individual viewer's viewing preferences, and optimize its preference prediction algorithm to each individual viewer.

The video content digest process may be further optimized by taking advantage of the fact that with modern personal video recorders, such as TIVO® recorders, the overall content of a video program is often known in advance, and thus a viewer typically has exercised a preliminary level of editing by simply selecting a particular program for viewing. The system may then use this knowledge of program type to help select a viewer preference setting that is optimized for that program type. For example, the system may understand that it is analyzing a news program, and use a news program rule, or a sports program, and use a sports program rule. A news program rule might deemphasize text elements and music elements. A sports program rule might show preference for green or blue or other outdoor elements, and so on.

A more detailed analysis of the process of assigning viewer preferences to individual video elements or descriptors in certain embodiments are discussed herein. For the following discussion, please assume that each element or descriptor may either be used as an index to a database to retrieve the relative user preference associated with that particular element or descriptor, or alternatively may be dynamically assigned a preference rating according to the methods taught below.

Video Element (Descriptor) Selection:

In addition to predetermined (factory set) viewer interest or importance ratings, during the assignment stage (240) of the video digest generator (220), each video element (340) may also be assigned a local rating. This local rating may also be interpreted as a measure of importance or relevance of the element, or in other words, an indication of desirability.

The local rating of a video element (340) may also be determined or adjusted (for example, modified from its predetermined factory setting) by measuring it's dissimilarity to other elements. In this scheme, an element would get a high rating if it is similar to a class of elements referred to as positive examples, and if it is dissimilar to another class of elements referred to as negative examples. A video element considered important may thus be represented by a high positive importance rating. Conversely, a video element is considered unimportant if it is dissimilar to positive examples and similar to negative ones, and the unimportant case is represented by a low (large negative) importance rating.

As previously discussed, positive and negative example elements may be defined in three ways: user interactions, factory default examples (usually the result of the large statistical database correlation method) and video elements contained in current video content.

Figure 5:
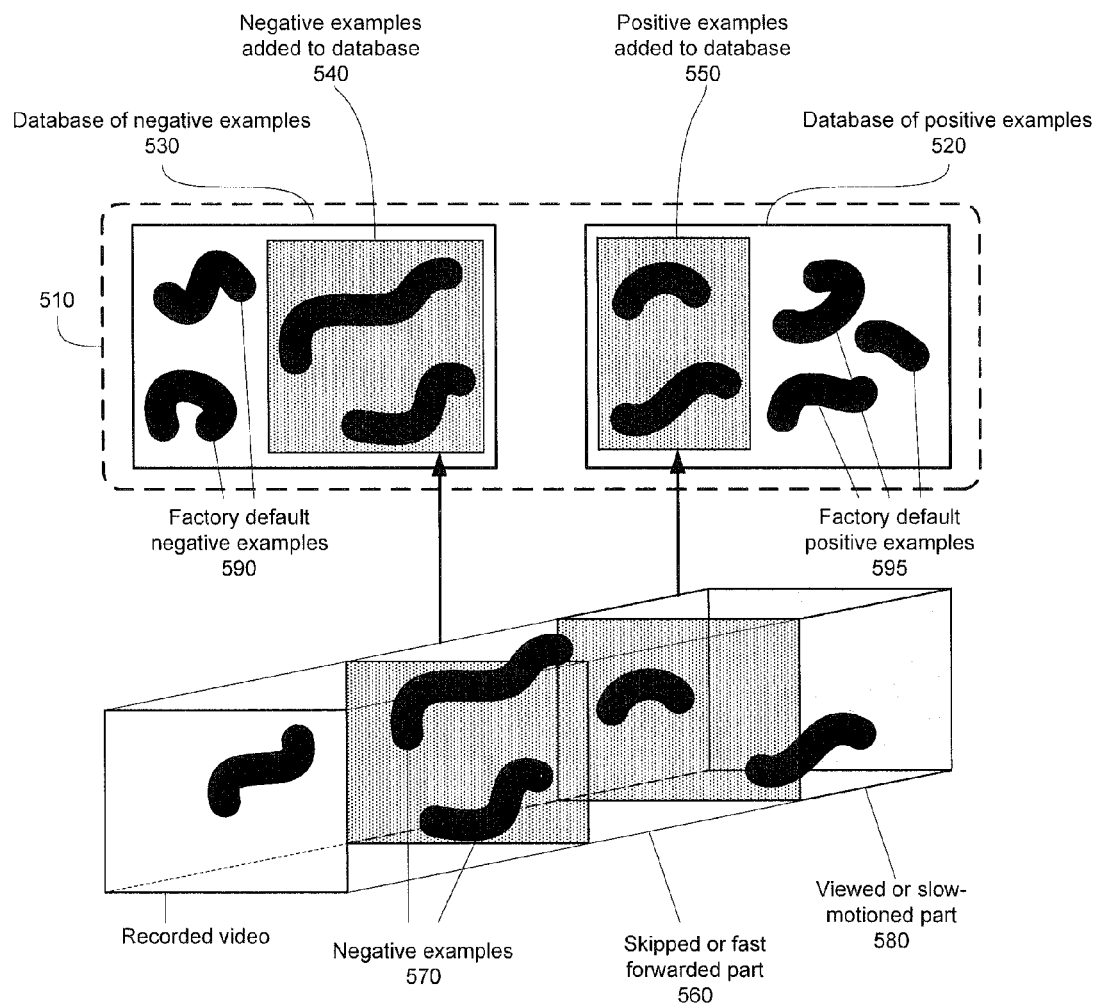
FIG. 5 shows generation of positive and negative example from the user behavior pattern in watching a recorded content.

User interaction involves analyzing the user behavior, recording the user preferences, and deciding which type of content the user prefers and dislikes. Explicit interaction, requiring the user to rate elements, is usually undesired being a distracting activity. As shown in FIG. 5, the up date of the positive example database (520) and the negative example database (530) may be performed during the use of the system, by means of implicit interaction with the user. The user may be watching a recorded video or a broadcast video content, where the former one has its video elements already created in division stage (230), and the later one has its video information stored during the encoding/decoding process. For example, if the user is viewing a recorded program and skips a portion (560) by fast-forwarding it, this may be an indication of the portion (560) being unimportant. Video elements (570) from such a portion may be added to the negative example database (530) as negative examples (540) and used for the importance rating assignment during video digest generation of other content in the future. Conversely, portions (580) at which the user focuses his attention may be added to the system positive example database (520) and used as positive examples (550) in the same manner. Video elements may be assigned with ratings according to example elements generated as described above.

Video elements may also be compared to the positive and negative examples in the database, and according to this, a decision whether to leave or remove an example from the database may be made. This is used mainly in order to reduce the effect of a possible situation where an element may appear both in desired and undesired content. For example, if a video element was added as a negative example (because it appeared in undesired content), and then reappeared multiple times in desired content as a positive example, it may be moved from the negative examples to the positive examples database, as representing more accurately desired rather than undesired content. An element appearing with the same frequency in desired and undesired content shall be removed as non-representative.

Besides user interaction, as previously discussed, a set of factory default positive examples (595) and negative examples (590) may be factory pre-stored in the system database, downloaded from a factory server, or added to the unit by a plug-in memory unit. For example, the system could remove advertisements within a video program and give priority to portions of the video in which human faces appear, if video elements containing human faces are stored in the database as default factory positive examples (595), and those containing advertisement are defaulted as negative examples (590). By comparing against the stored examples, video elements appearing in advertisements may be given low ratings and will likely be removed so as not to appear in that particular video digest, whereas those containing human faces will be given high ratings and will be more apt to appear in the resulting video digest.

One way of determining the importance of an element is by relating the element to the video content in which the element itself exists, or in other words, detecting the self-similarity of the video content. Several video elements in the video content may be detected, selected, and stored in the database (510) as example elements during encoding/decoding process, and that element (340) may then be compared to those examples stored in the database (510) for the rating purpose.

Figure 6:
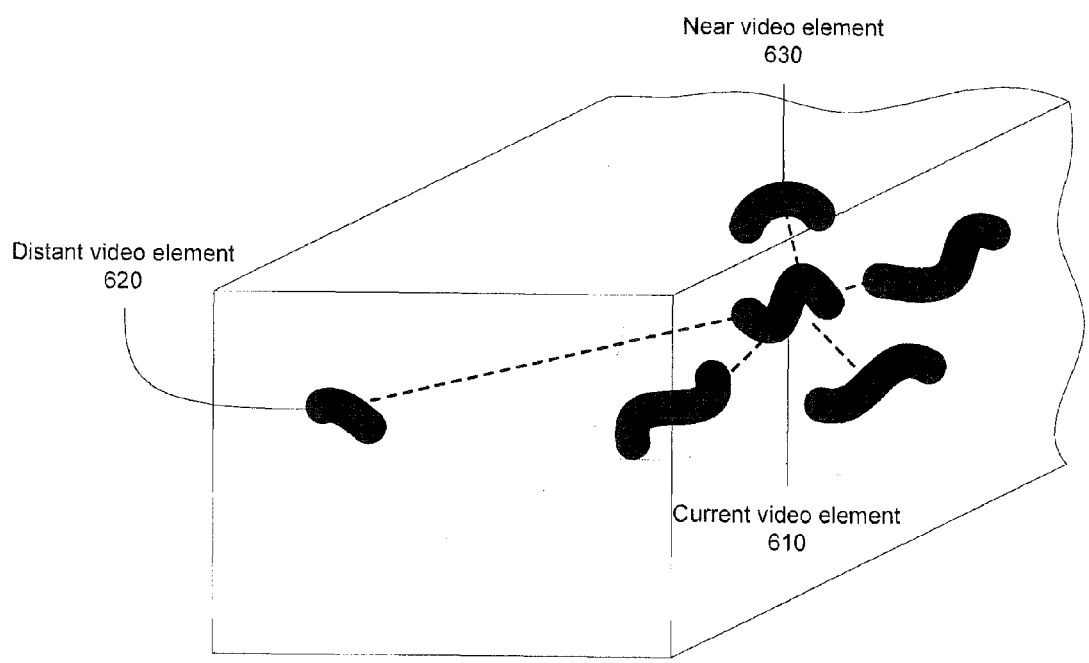
FIG. 6 illustrates spatio-temp orally distant and near elements.

FIG. 6 shows a video element (610) being compared to other video elements in the same video sequence. For example, if the video element (610) is similar to the spatio-temporally distant video element (620), this may be an indication of redundancy. In a situation like this, the relative viewer interest rating associated with the redundant element may require modification.

Regarding spatio-temporally distant video element (620) as negative example, redundant video elements may be given a low importance rating, which will result in their removal during the video digest process. As another example, if the video element (610) is dissimilar to spatio-temporally near video elements (630), this may be an indication of unpredictability, which may be caused by appearance of new objects or abnormal behaviors that disrupt the local continuity of the video sequence. If spatio-temporally near video elements (630) are regarded as negative examples, video elements corresponding to sudden events will be given a high importance rating, as being probable key events in the sequence.

Figure 7:
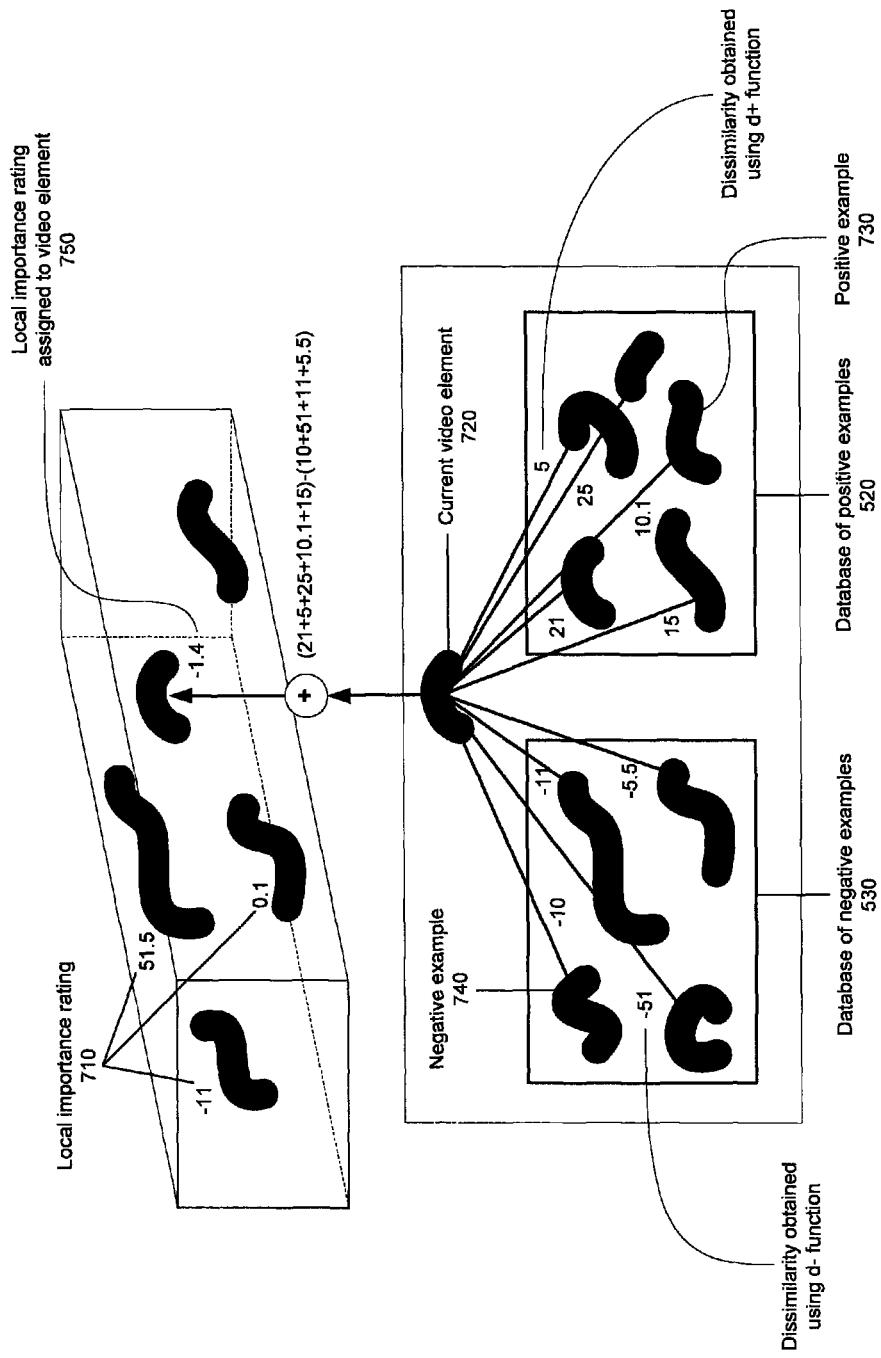
FIG. 7 shows the second stage of video digest generation: assignment stage.

In one embodiment of the invention, as shown in FIG. 7, the algorithm used to assign a rating (710) to a video element (720) performs as follows: the video element (720) may be compared to all the positive examples (730) in the database using a dissimilarity function d+; the video element (720) is then compared to all the negative examples (740) in the database using a dissimilarity function d−; values obtained using dissimilarity function d− are summed up with negative sign; values obtained using dissimilarity function d+ are summed up with positive sign; the total sum of values from both functions yields a rating (750) representing the importance of the video element (720). The local rating of current video element v may be computed as follows:

$$\text{Rating}(v) = \sum_k d_+(v_k, v) + \sum_j -d_-(v_j, v)$$

where $v_k$ are negative examples and $v_j$ are positive examples, and d+ and d− are measure of dissimilarity to positive and negative examples, respectively. Negative values of Rating(v) imply that v is unimportant, whereas positive values of Rating (v) imply that v is important.

Various dissimilarity functions and methods previously taught in the literature are suitable for this step. A few examples of these methods are shown below.

Generically, the measure of dissimilarity between two video elements is quantified by a bivariate function denoted by d(v, w), where v, w are two video elements. As a particular case, it may be assumed that d(v,w) obtains only non-negative values, is a symmetric and transitive relation, i.e., corresponds to a mathematical definition of a generic metric between w and v. Hereinafter, the terms distance, dissimilarity and metric are used synonymously.

It is often possible to compute dissimilarity as a sum of different distance functions, for example, $$d(v, w) = \sum_k d_k(v, w)$$

where $d_k$ are different distance functions.

The choice of the particular way to measure dissimilarity depends on the video elements, into which the video sequence is divided, at the division stage. For example, if pixel blocks of uniform size are used as video elements (340), simple measures of similarity such as sum of absolute differences (SAD) or sum of squared differences (SSD) may be employed.

If the video elements (340) have different shapes, similarity measures based on comparing the histograms of element pixels may be used, in the following way:

$$d(v, w) = \|h(v) - h(w)\|$$

where h(v) is the histogram of the pixels of element v, and $\|\ \|$ is a norm (for example, the L1, L2, or Linf norm). The comparison of pixel intensity histograms may be performed in both time domain and frequency domain. A more sophisticated way to measure distance between distributions, such as the Monge-Kantorovich earth-moving distance (EMD), Bregman distance or Kullback-Leibler divergence, may be used to compare the histograms. Such similarity measurements may be used for nudity detection, where video elements (340) have arbitrary geometries, such as elements containing skin. If video elements (340) are objects with properties known a priori (e.g. human faces), more specific similarity measurements described in literature may be used. For example, in order to compare faces of two different subjects, comparison of facial features such as eyes, mouth, nose etc. may be used.

Stages (230) (division) and (240) (assignment) may be repeated iteratively, as a refinement method. First, I(x, y, t) is divided into some initial video elements, e.g., regular overlapping blocks. Then, each block is assigned an importance rating, which is represented as a matrix Rating(x, y, t), e.g., by means of interpolation. A new division is created based on the importance rating, e.g. by finding the edges of Rating(x, y, t). The whole process is repeated in several iterations until convergence, which may be determined by small variations of the video elements. Here, schemes similar to the Max-Lloyd vector quantization method, (described in A. Gersho, R. M. Gray, "*Vector quantization and signal compression*", *Springer international series on Engineering and Computer Science*, 1991), may be used.

Aggregation of Video Elements into Video Aggregates

Often, an improved prediction of potential viewer preference or interest may be achieved by combining or "aggregating" individual video elements into larger groups. This will typically disclose not only time segments of video that users have particular interest or preference in, this will also disclose portions of the video image that users may have particular interest or preference in watching. For example, if all of the interesting action is taking place in a portion of the image for a portion of time, the system may be set to "zoom in" on this interesting region.

Figure 8:
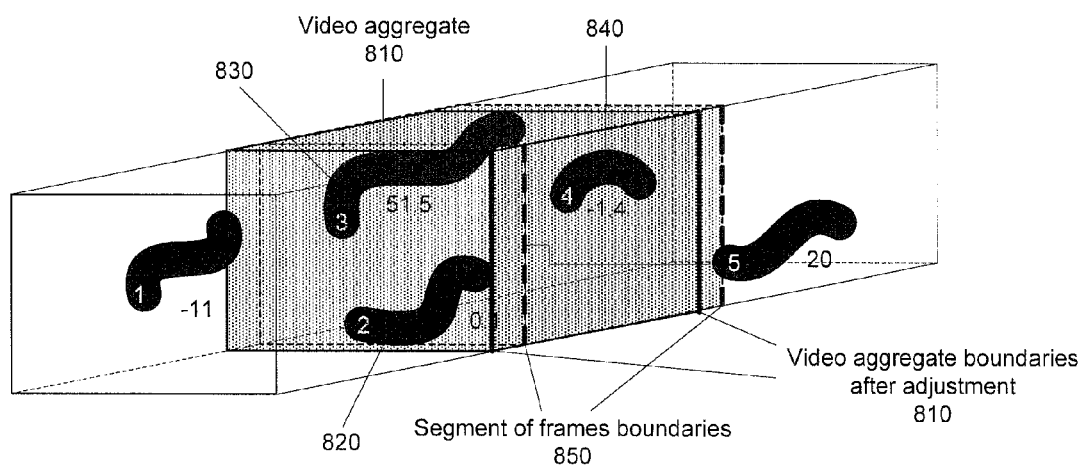
FIG. 8 shows aggregation of video elements into video aggregates.

Since video elements (340) may be spatio-temporal regions of arbitrary shape, which means they may be in a non-displayable format due to the randomness of their shapes, another stage converting them into subsets of video, referred to as "video aggregates," which allow video elements to be properly displayed, is usually required. One of the preferred embodiments of such aggregation process is shown in FIG. 8. The aggregation stage (250), creating a video aggregate (810) by aggregating video elements (820), (830), and (840), consists of several steps: the video may first be divided into segments of frames (typically ranging between 100 to 1000 frames), with possible overlap between each segment; for each segment of frames, video elements falling within this segment are identified from the binary map computed at division stage (230), for example, elements (820), (830), and (840) are identified in segment (850) (the dotted-line boundary box); the video aggregate (810) (hard-line boundary box) are formed by adjusting the temporal extent of segment (850) (i.e., the starting and ending of segment (850)) so that each video element within the video aggregate (810) may be contained entirely, i.e., element (840) and (830) are cut off by the dotted-line box (850), but are included entirely by the hard-line box (810) after the adjustment. In one of the preferred embodiments, if two video aggregates overlap, as a result of the previous step, they are merged into a single one.

Figure 9:
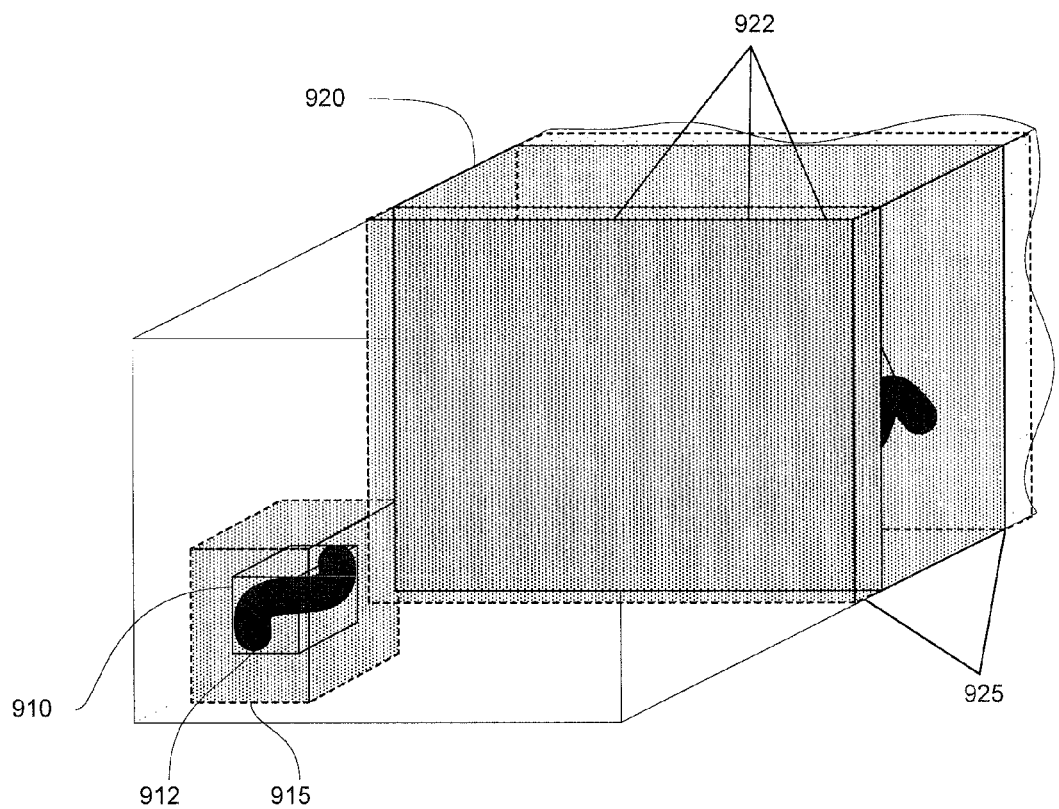
FIG. 9 shows example video aggregates defined as a temporal bounding box and a spatio-temporal bounding box.

As shown in FIG. 9, a video aggregate, such as the bounding box (910), may be generally defined as an aggregate spatio-temporal group of contiguous pixels spanning at least certain ones of the plurality of sequential frames of the video that contains one or more video elements, and in many instances more than one video element. More specifically, a video aggregate may preferably be a rectangular spatio-temporal region containing video elements. The result is a rectangular region (910) in the sequence of frames containing the video element (912).

A particular case of the spatio-temporal bounding box (910) is a temporal bounding box (920), which takes up the whole frame size, containing one or more video elements (922). The result of a video aggregate in this case is a sequence of frames containing video elements (922).

The video aggregate defined as a temporal bounding box (920) may also contains temporal margins (925), i.e., a sequence of frames adjacent before and after the temporal bounding box (920). The number of frames may be preset or content-adaptive. In a generalized case, the video aggregate defined as spatio-temporal bounding box (910) may contain spatio-temporal margins (915), i.e. rectangular blocks of pixels around the bounding box.

Besides video elements, audio elements may also be created, and also correlated with user interest or viewing preference. Audio streams, such as a sequence of sampled audio digital signals, are usually synchronized with video sequences while delivered as a broadcast media. Since the audio is a one-dimensional signal, its processing generally is computationally less intensive, because audio has fewer degrees of freedom compared to the video component.

When inputting to a video digest generator, audio elements are detected and created according to criteria such as sequence length and audio patterns. The simplest way to define an audio element is by detecting uniform blocks of audio signals. Another way is by detecting pre-determined audio patterns such as shots, human speeches, pre-defined words, and music, spectral energy (commercials, associated with negative viewer preference, often alter the distribution of energy vs. sound spectrum to attract attention), and other methods. Audio elements are also given a rating and are being aggregated using method described above. The resulting aggregates of audio elements, referred to as audio aggregates, may then be presented together with video aggregates. The audio aggregates may also contain temporal margins adjacent before and after the audio blocks, so that the audio aggregates contain complete audio elements.

Many different algorithms and methods for sound analysis may be used. One example is the wavelet transform or discrete wavelet transform (DWT) algorithm of Tzanetakis et. al., "*Audio Analysis using the Discrete Wavelet Transform* (Princeton, 2001)", and U.S. Pat. No. 7,196,641. Here, sound is analyzed according to the function:

$$W(j, k) = \sum_j \sum_k x(k) 2^{-j/2} \psi(2^{-j} n - k)$$

Where $\psi(t)$ is a mother wavelet time function with finite energy and fast decay. This method may classify sounds as to music or speech, voices, music type, and other categories.

Other methods of sound analysis include commercially available speech recognition algorithms, software, and systems, such as Dragon Naturally Speaking (Nuance Corporation, Burlington Mass.), and others. These methods often rely upon Hidden Markov model algorithms, which may be trained (optimized) for the video media at hand, and which have relatively low computational overhead.

Figure 10:
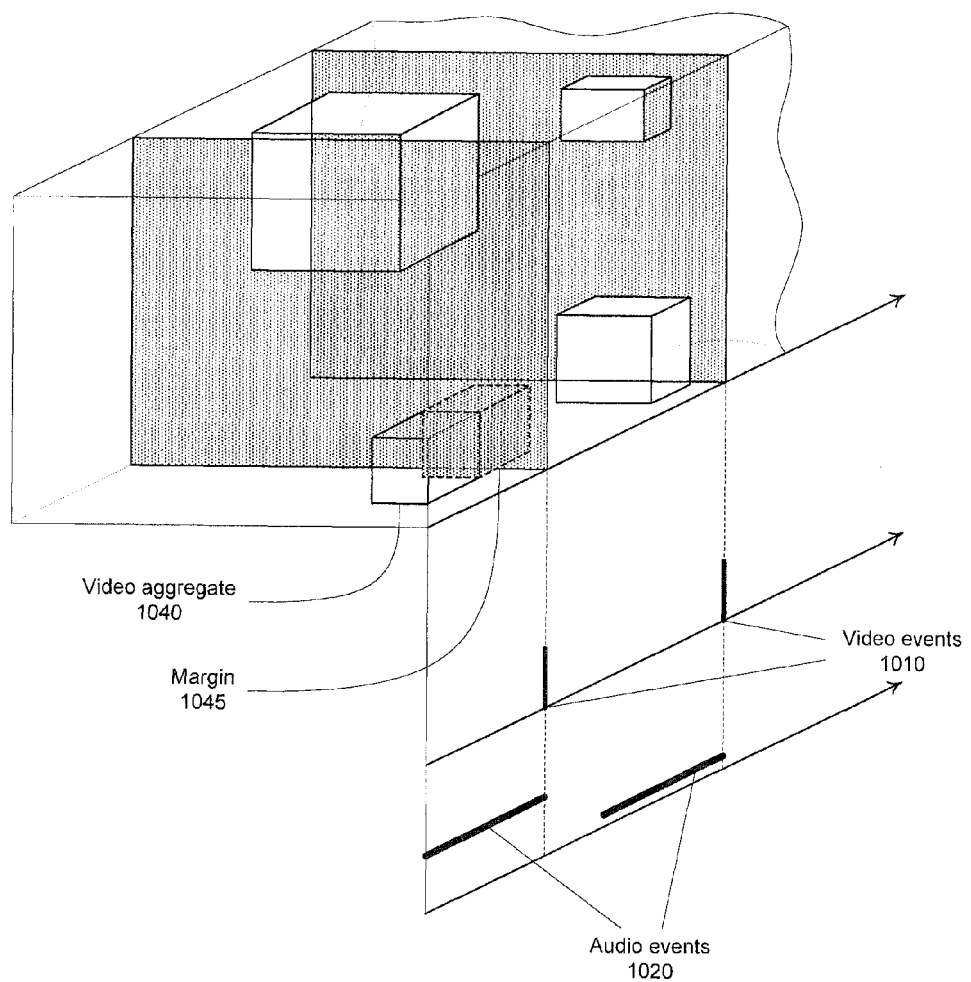
FIG. 10 shows aggregation of important video elements into video aggregates using additional event information.

Additional information may be taken into consideration when defining the video and audio aggregates. For this purpose, video events (1010) and audio events (1020) defined in FIG. 10 are created. Events represent additional information that is not necessarily conveyed in the definition of the video aggregates, and that should be accounted for during the display (output) of the video digest. For example, the temporal duration of the video aggregate should preferably contain an entire speech fragment, and not interrupt it in the middle.

An event may be instantaneous or long. Examples of instantaneous events may be: shot cut (transition between video sequences captured continuously by a camera, or resulting from editing), beginning of an advertisement, first or last appearance of an object, etc. Examples of long events may be: speech sound in the audio track, music, continuous camera motion, etc.

FIG. 10 shows an example of simultaneously processing video aggregates and audio aggregates. In this example, the boundaries of video aggregate (1040) interrupt the audio event (1020). The temporal extent of the video aggregate (1040) may be adjusted by adding the margin (1045) in order for it to contain entirely the event (1020).

Generically, the video aggregate resulting from the aggregation of video elements and audio and video events may be presented as a logical operation (union, intersection, complement and combinations thereof) between them.

Similar to video elements (340), video aggregates are also given an importance rating, or to the extent that a video aggregate corresponds to the video element, it may have the same importance rating. The local ratings (1130) of each video element contained in the video aggregate are aggregated to generate a global rating (1110) of the video aggregate.

Figure 11:
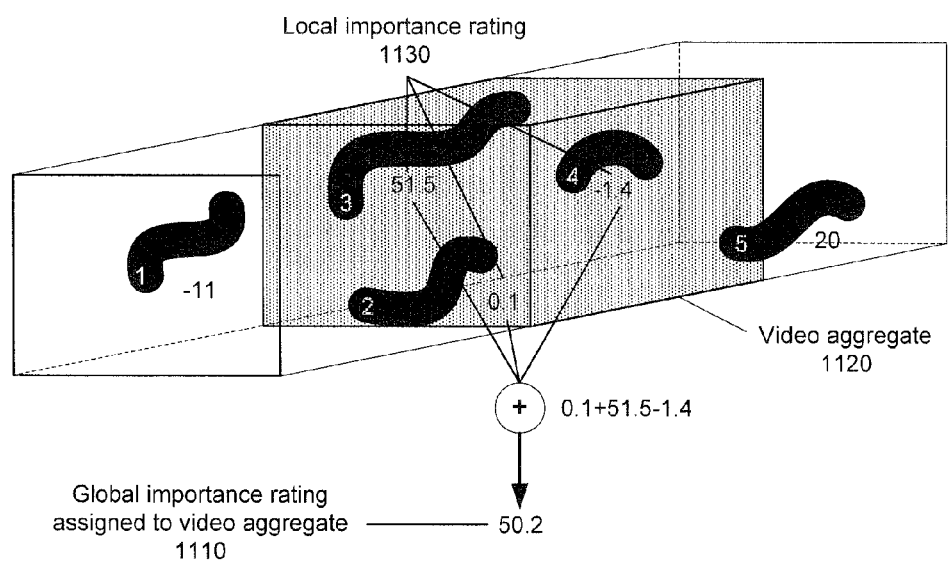
FIG. 11 shows aggregation of local importance ratings into global importance rating.

FIG. 11 shows one way of obtaining global rating (1110) of a video aggregate (1120) by summing up the local importance ratings (1130) of each video element contained therein. Other ways, including averaging, taking the maximum, taking the minimum, taking distributions, taking square roots of the importance ratings (1130) of the video elements of the video aggregate (1120), should be apparent to those ordinarily skilled in the art, and those are also included in the spirit of the invention.

The global rating (1110) has significance in displaying the video aggregates. One way of sorting video aggregates is in descending order according to their global importance ratings, and such order will be used in organizing video aggregates to obtain the video digest.

The specific way in which the video aggregates are selected and displayed through the user interface (260) largely depends on the mode in which the video digest generator is working. Some of these modes may be directly controlled by the user as described in the next section discussing an example of a user interface.

User Interface

In this example, the function of the user interface (260) is to interact with the user, and select and display the video aggregates obtained as the output of the video digest generator. The interaction with the user may be divided into explicit and implicit categories. Explicit interaction includes functions that the user may control. The basic capabilities that may be given to the user include setting the parameters used by the video digest engine. These parameters may include the digest duration (which, in turn, may be pre-set in a few modes described in the following section), control of the video digest generator output, and navigation throughout the video.

The video digest method may obtain additional information by observing user behavior, and forming rules based upon this observation of user behavior. This type of passive (as far as the user is concerned) information gathering is termed "implicit interaction".

The video aggregates to be displayed (output) may be arranged temporally (i.e., the video aggregates are displayed one after one, in some order), or spatially (a plurality of video aggregates is displayed simultaneously). The former is referred to as video trailer and the latter as video poster.

Figure 12:
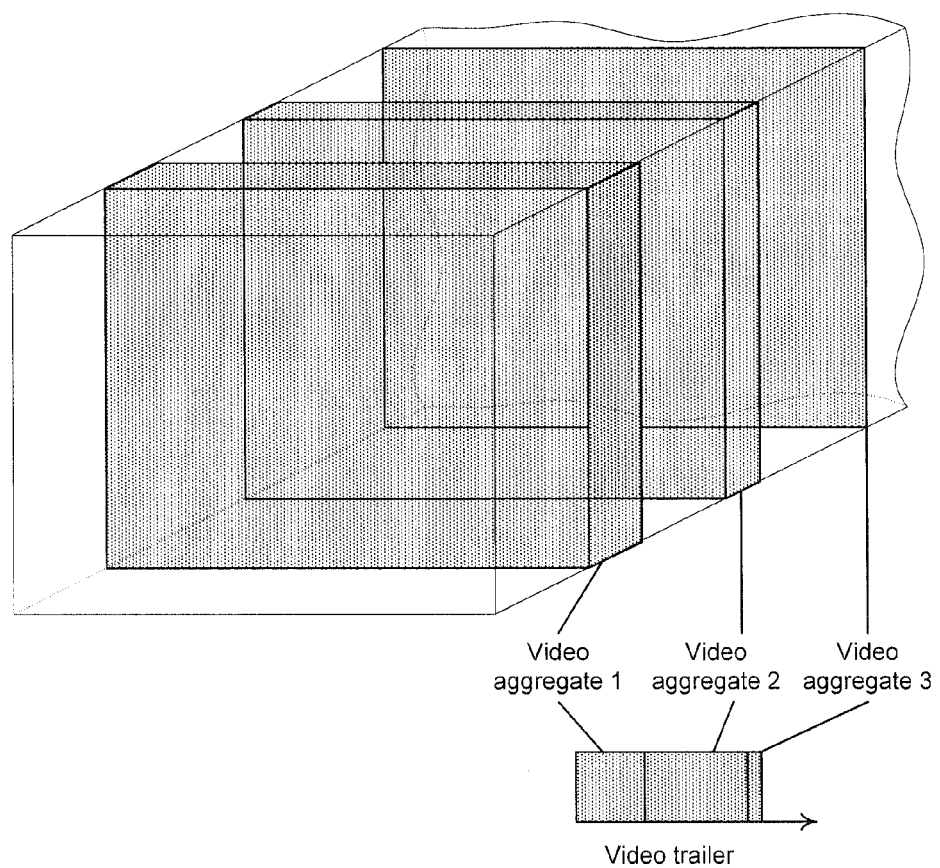
FIG. 12 is a conceptual illustration of a video trailer generation.

FIG. 12 shows a video trailer (temporal) generation, from which, the video aggregates are presented in some order. In this case, the video aggregates used are of entire frame size (e.g. obtained as temporal bounding box (920)), or subsets of the frame (e.g. obtained as spatio-temporal bounding box (910)), scaled accordingly. This is likely to be a more common or more popular mode of using the invention. Here the user simply sees those portions of the program that the system estimates are most likely to attract user preference or interest, and the system skips or fast forwards though those portions of the program that the system estimates are likely to be less preferred or interesting to the viewer.

The selection of video aggregates that will be displayed in the video trailer (FIG. 12) may be performed as follows: the video aggregates are first sorted according to their rating in descending order and those with the highest rating are selected; the number of video aggregates to be selected depends on the duration of the video trailer to be generated, which is a parameter controllable by the user; the user may also control the order in which the video aggregates are presented (two basic possibilities are chronological order or importance order) and the speed of their playback.

Determining the similarity of video aggregates may be performed by multidimensional scaling algorithms and their variants, which represent a dissimilarity structure as a pattern of points in a low-dimensional space.

As previously discussed, however, at times the system may detect that the use is likely to only be interested in a certain region of the video image, and that only at certain times. In some embodiments, the system may be set to pick out those picture regions and times estimated to be most preferred, and present them to the user. If the system is set to combine interesting portions of the image, and show more than one most interesting image portion on the screen at the same time, the result is a "video poster".

Figure 13:
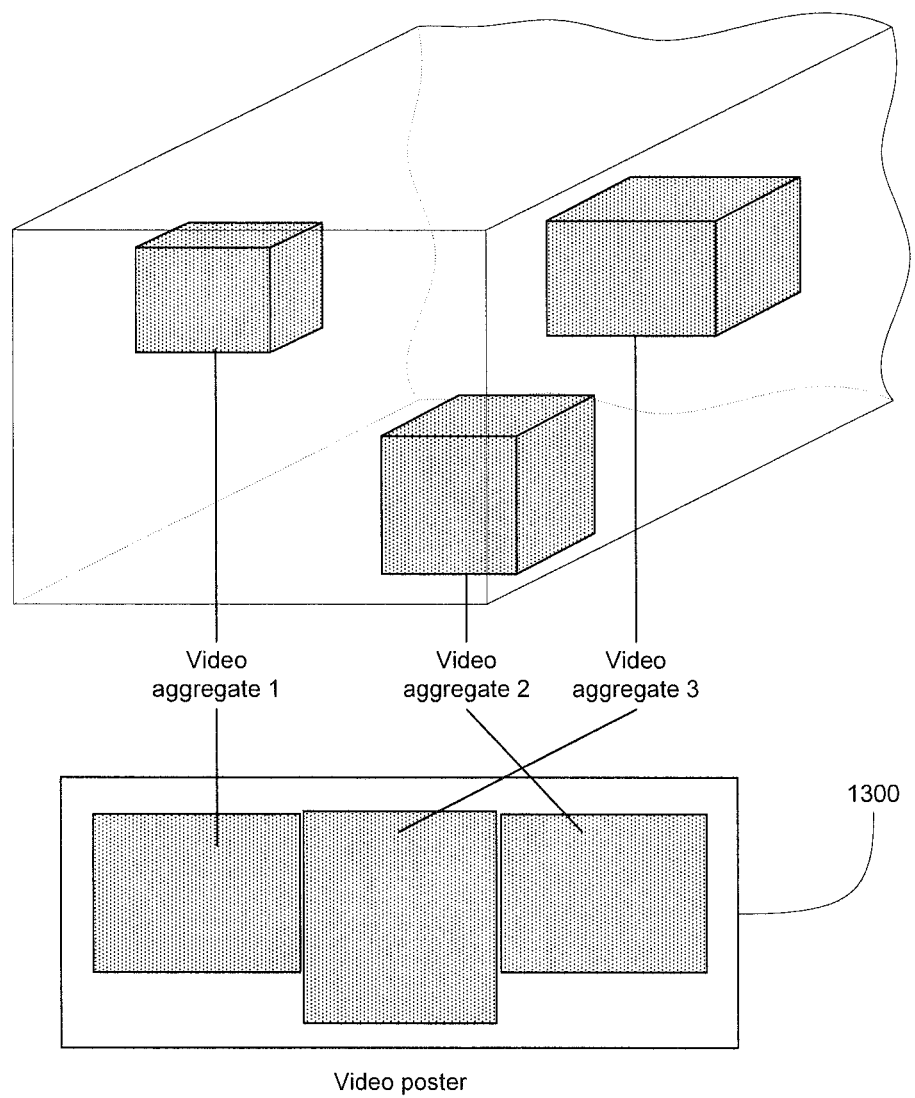
FIG. 13 is a conceptual illustration of a video poster generation.

FIG. 13 shows a video poster (spatial) generation, from which the video aggregates are presented together as portions of the same image (1300). The video aggregates may be of different sizes in this case. In order to fit the displayed video poster to the display resolution, a spatial up- or downscaling may be required. The spatial arrangement of the video aggregates may be fixed, or dependent of the content and the user settings. The playback speed of each video aggregate may be constant or variable, and also be given as a parameter to the user.

For example, a viewer who is interested in only looking at the expressions on the faces of the people in a scene, and wishes to look at only that, could create a composite video poster showing just the heads of the people on screen at the same time. This could be particularly interesting in understanding the dynamics of group interactions.

The selection of video aggregates that will be displayed in the video poster (FIG. 13) is done similarly to the case of video trailer. The number of video aggregates to be selected depends on the spatial configuration of the poster, i.e., how many videos simultaneously displayed it may accommodate, and the length of each such video. The user may control the spatial configuration of the poster (number of simultaneously displayed video aggregates, their locations). The video aggregates locations and sizes may be fixed, dependent on the video aggregates importance and specific contents (e.g. all video aggregates containing human faces are displayed on the top), or based on video aggregates similarity (e.g. video aggregates containing similar video elements, or video elements similar to a common example element may be grouped together).

Video poster and video digest may be used as a visualization tool for browsing through the input video. This may be done both in the video trailer and the video poster modes. The mechanism behind such navigation is a hyperlink-type interface or remote control, allowing the user to click a region of the poster (or press a button while a certain video aggregate of the video trailer is playing). The result of this action will display a larger portion of the video from the selected temporal location currently being displayed. Alternatively, the entire scene containing the current video aggregate may be presented. Implicit interaction with the user may be used for configuring the video digest engine. By analyzing user behavior, the system may determine which type of video content and image elements the user prefers, thus refining the importance rating criteria. For example, if the user is viewing a recorded program and skips a portion of it by fast-forwarding, this is an indication that the user may regard this portion as being unimportant. Video elements from such a portion may be added as negative examples, and used for the importance rating assignment during video digest generation of other content in the future. Conversely, portions at which the user focuses his attention may be used as positive examples in the same manner.

Applications and Use Cases of Video Digest

By using different core video digest generator parameters and sets of parameters, the video digest engine may be optimized for different applications and use scenarios. Such sets of parameters may be defined as pre-set modes available for choice in the user interface. The following conceptual uses and corresponding modes are distinguished: abbreviation function (1410), summary function (1420), and preview (fast forward) function (1430).

Figure 14:
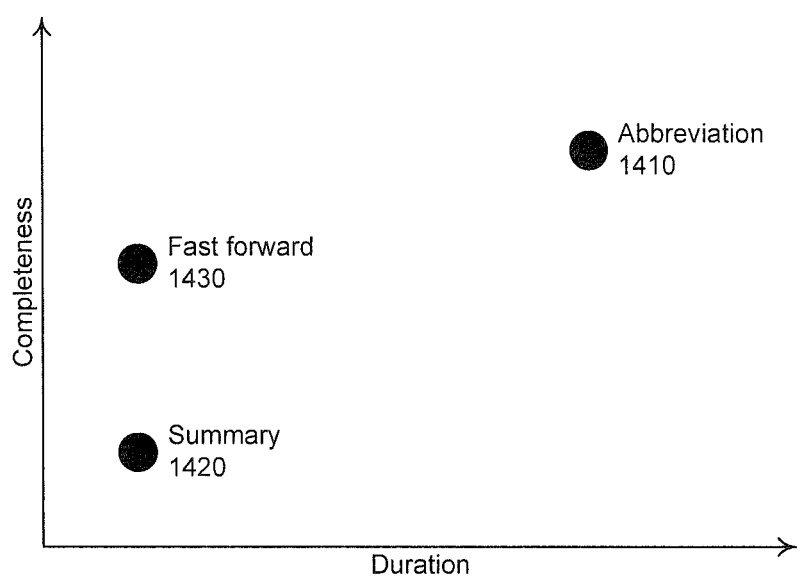
FIG. 14 shows the usage of the video digest represented in terms of duration and covering.

FIG. 14 shows the two main factors controlling the different uses of video digest: "duration" and "covering)". Duration refers to the extent to which the video aggregates produced by the video digest generator become shorter than the original content. Covering refers to uniformity with which the selected video aggregates cover the original video, i.e., how complete may the viewer's impression of the original content may be from viewing the selected video aggregates. Both factors may be represented on the scale 0-100.

Figure 15A:
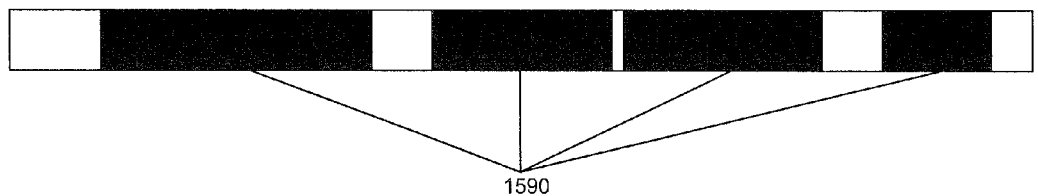
FIG. 15A-C shows significant content portions using video digest with different methods.
Figure 15B:
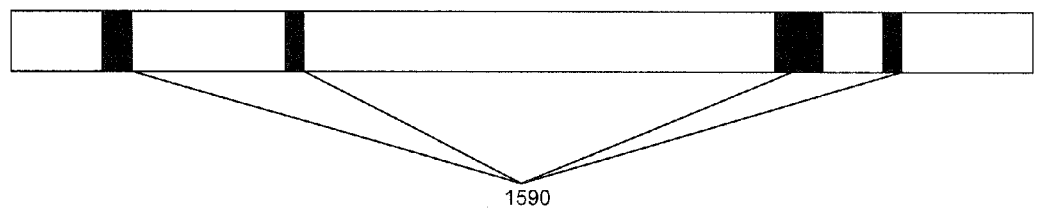
Figure 15C:
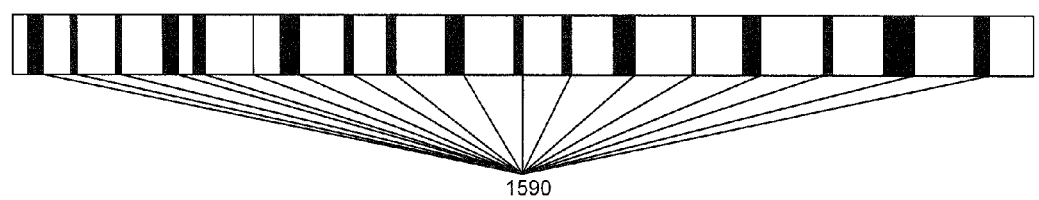

FIG. 15(A-C) shows conceptually the portions of the video removed and remaining (1590) using the different abbreviation (15A), summary (15B) and preview (15C) modes.

Abbreviation mode (15A) results in a video digest with both large duration and covering. The main emphasis is on showing the content in less time, leaving as much as possible of the original content. In a typical case, most of the meaningful information in the video is preserved, such that content deletion is not noticeable (50-90% of the content remains). Abbreviation may be conceptually compared to an abridged book: the content is almost the same, though takes less time to read.

As a typical application, we may think of a digital video recorder (DVR), used for recording programs for future viewing. A typical user will set up the DVR to record a program transmitted while he is at work and will watch it later in the evening. Often, the user does not have time to watch all the programs he would like to: the amount of content is too large. Using video abbreviation, it is possible to make the user watch more content he wants in less time. The video digest length is a parameter that is typically given to the user control. As one simple example, the system of FIG. 15A may be set up to simply skip commercials and/or opening and closing credits, while displaying the rest of the program.

When in the abbreviation mode, the video digest duration parameter is large (the user controls the percentage of the original duration), the display mode may be a video trailer with the various video aggregates presented in chronological order.

The first level of abbreviation is achieved by removing unimportant information. This may be performed by means of negative examples, i.e., finding of information that is a priori known to be unimportant (e.g. advertisements, open and closing credits) or, by finding important information and removing all the rest, or a combination thereof.

The second level of abbreviation may be achieved by changing the speed of video aggregates that are displayed. For example, the display speed of a video aggregate may be inversely proportional to its importance, such that important video aggregates are displayed with their normal speed, while less important video aggregates are displayed quicker. If audio playback is allowed, the audio duration is changed accordingly by means of commonly used audio time domain compression/expansion signal processing methods, which allow changing the duration of an audio without altering its pitch.

The summary mode (15B) results in a video digest with small duration and small covering. The main emphasis is on leaving only the most representative "highlights" of the video content, which will help the user make a judgment about the entire content. In a typical case, only a small portion of the data (1-20%) will remain. An example from motion picture industry is a movie trailer, showing highlights from the movie scenes. Unlike abbreviation, the main problem in summary generation is the detection of the most meaningful and representative portions.

When in summary mode, the video digest duration parameter is small (the control is given to the user) and the display mode is either a video trailer or a video poster. "Highlights" are selected video aggregates with high importance rating, either content-related (objective) or user-related (subjective), or a combination thereof. Subjective importance is based on positive and negative examples accumulated from previous implicit user interaction.

The preview (fast forward) mode (15C) results in a video digest with small duration but high covering. This mode is typically an intermediate use mode between summary and abbreviation, described above. Here the user wants to have an impression of the entire content but, in a significantly shorter time (for example, 4 to 32 times faster). Essentially this is an improvement on the traditional "fast forward" setting.

Fast forward (or fast reverse) is a traditional way of rapid video content navigation, and is used mainly to skip ahead to portions of the content that the user wants to see. The main disadvantage of traditional fast forward is that it is linear, accelerating the playback uniformly throughout the video. As a result, if the fast forward speed is too high, the displayed content becomes meaningless to view (e.g. at ×32 playback speed the user sees chaotically changing frames). Speeds at which the content may be understood are usually slower (×4-×8 speed), which has drawbacks because this slower fast forward speed takes more time.

By contrast, using the invention, when in preview mode, the display mode may be a video trailer that displays portions of the video (video aggregates) in time order. The user controls the global playback speed; the actual speed is adaptive. Most of the portions of the video that the system estimates are interesting to the viewer (video aggregates) are preserved, and these are played at a low enough speed to be better appreciated by the viewer. Portions of the video that the system estimates will be less interesting to the viewer may be played back at higher speed. The net effect may be a "fast forward" process that on the average is just as fast as traditional "fast forward", but is easier to control because the system essentially gives the viewer more time to react during "interesting" portions, and thus find the right region of video with less trial and error.

Figure 16:
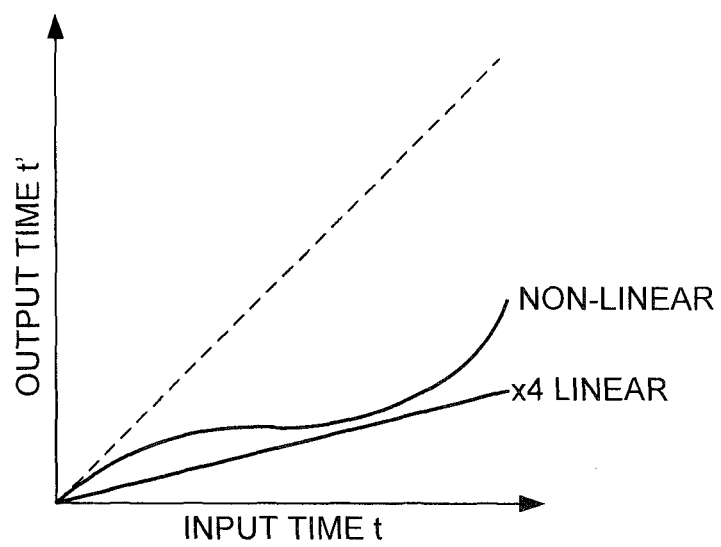
FIG. 16 illustrates non-linear time warp for preview generation.

FIG. 16 illustrates the preview mode according to the invention, which may be conceptually thought of as non-linear warp of the time axis of the video, making some video aggregates played faster and some slower, according to their importance. Depending upon the system setting, some video aggregates known as unimportant (e.g. advertisements) may be completely skipped altogether. The importance is also determined according to content- or user-criterion. The main control for the user is the forwarding speed.

Spatio-Temporal Zooming and Video Navigation

Another application of the data generated by video digest is navigation in the video. Thinking of video as a three-dimensional structure of data (two spatial dimensions plus one temporal dimension), the user may navigate through this data in different ways.

An example of simple navigation is fast-forward, in which the video is traversed with uniform speed in temporal dimension, with the speed depending on the user input. Similarly, the video may be traversed in backward direction by rewind controls. Today, this is the most common way of video navigation supported by DVRs, typical controlled by two buttons, such as those shown in FIG. 17B: forward (2610) and backward (2600).

Employing the video digest in the aforementioned preview mode with conventional forward and backward navigation controls allows traversing the temporal dimension with non-uniform speed, with the speed locally depending on the importance of the content, and globally on the length of the video digest specified by the user. The video digest in this case removes the unimportant details for the purpose of fast temporal navigation.

Figure 17A:
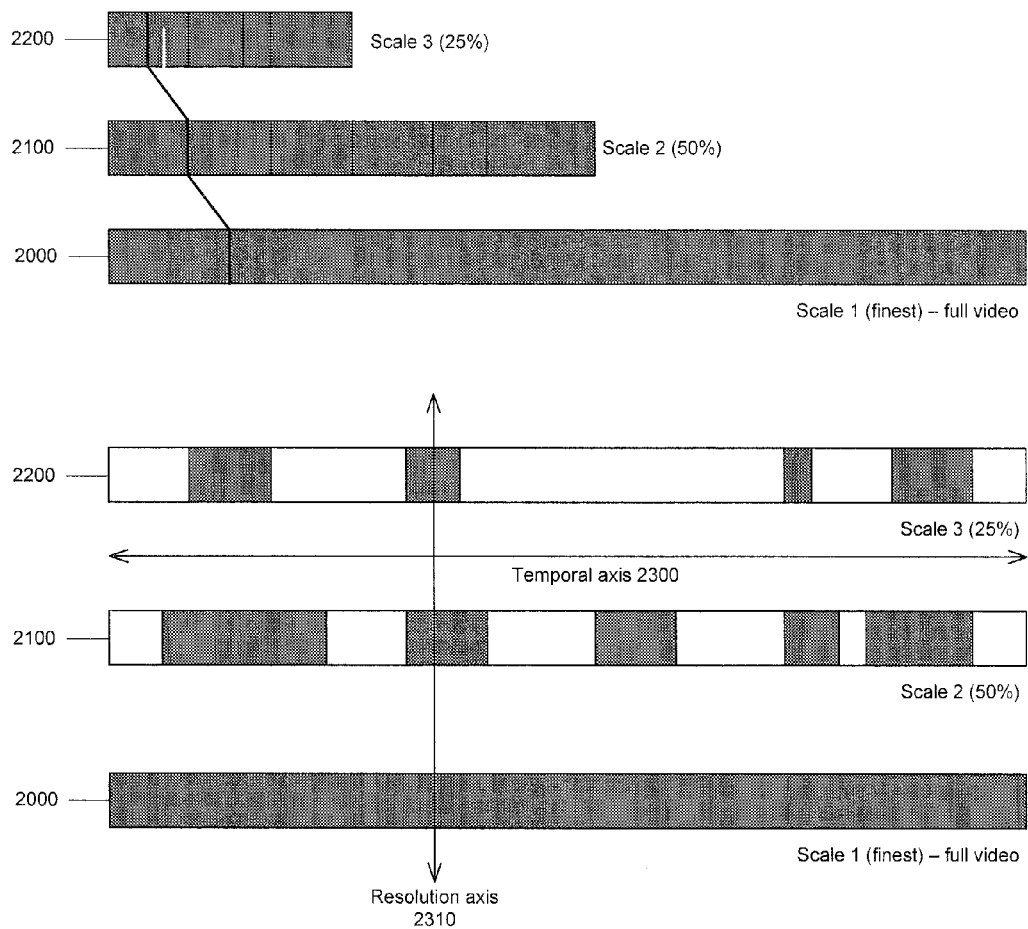
FIG. 17A illustrates the hierarchical structure of data used for video digest guided navigation through video.
Figure 17B:
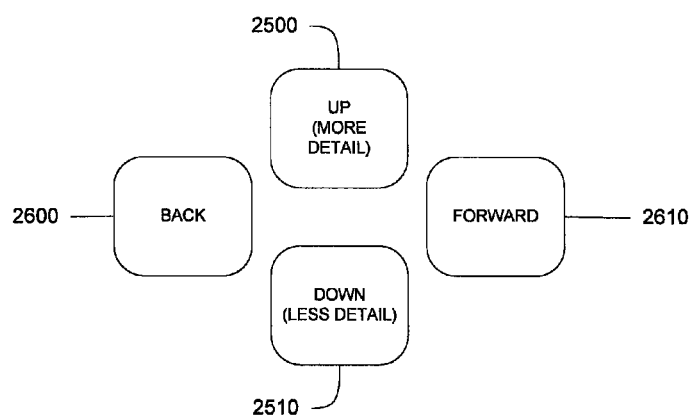
FIG. 17B illustrates a user interface for hierarchical navigation through video.

The ability to control in real time the amount of removed details (the resolution of the video digest), or in other words, the length of the video digest, gives the user a capability referred here as "temporal zooming". FIG. 17B depicts the possible modification of the standard video navigation control interface for the purpose of temporal zooming by means of adding two buttons: going up (2500) and down (2510) in the resolution.

In one of the preferred embodiments of the invention, the temporal zooming may be implemented by creating a multi-resolution hierarchical structure of frames. The information produced by the video digest generator may be used to create multiple video digests of different length, each shorter video digest being a subset of the next longer one in the preferred embodiment. FIG. 17A shows a particular embodiment using a dyadic hierarchy, in which the finest scale is the full video (2000), the next coarser scale (2100) contains 50% of the full video; the third scale (2200) contains 25% of the full video, and so on.

The hierarchy of video digests may be presented in a chronological manner, thus creating a scale-space with the temporal axis (2300) and resolution axis (2310). FIG. 17B depicts the possible control interface for the purpose of navigation, including the control to go up (2500) and down (2510) in resolution and back (2600) and forward (2610) in time. Since the hierarchy may be constructed in such a way that the next coarser level may be a subset of the previous one, there may be a seamless transition from one level to another. Typically, the navigation may start from the coarsest scale (corresponding to the shortest video digest), and go down to finer resolution scales, as the user identifies a content of interest and wants to watch in more detail.

Another way of video navigation is spatial zooming, in which only part of the spatial information (frame) is displayed. This capability is supported in some prior art DVRs, with control typically consisting of two group of buttons: magnification (zoom in and zoom out), controlling the size of the spatial region that is displayed, and pan (left, right, up and down), controlling its location in the spatial dimensions. Prior art "dumb" DVRs were unable to tell what portions of the image should be zoomed in on, however, and thus needed to be manually controlled by the user.

Video digest allows automatically zooming in on important parts of the video in a content-adaptive manner. In one of the preferred embodiments of the video digest, the video aggregates are created as spatio-temporal bounding boxes, which, when displayed, may act as content-adaptive spatial zooming. When a video aggregate is traversed during navigation, it may be automatically scaled to the display size, thus automatically displaying part of the spatial information which is most relevant at the current moment of the video. This capability may be combined with conventional zoom controls (magnification and pan).

EXAMPLES

Figure 18:
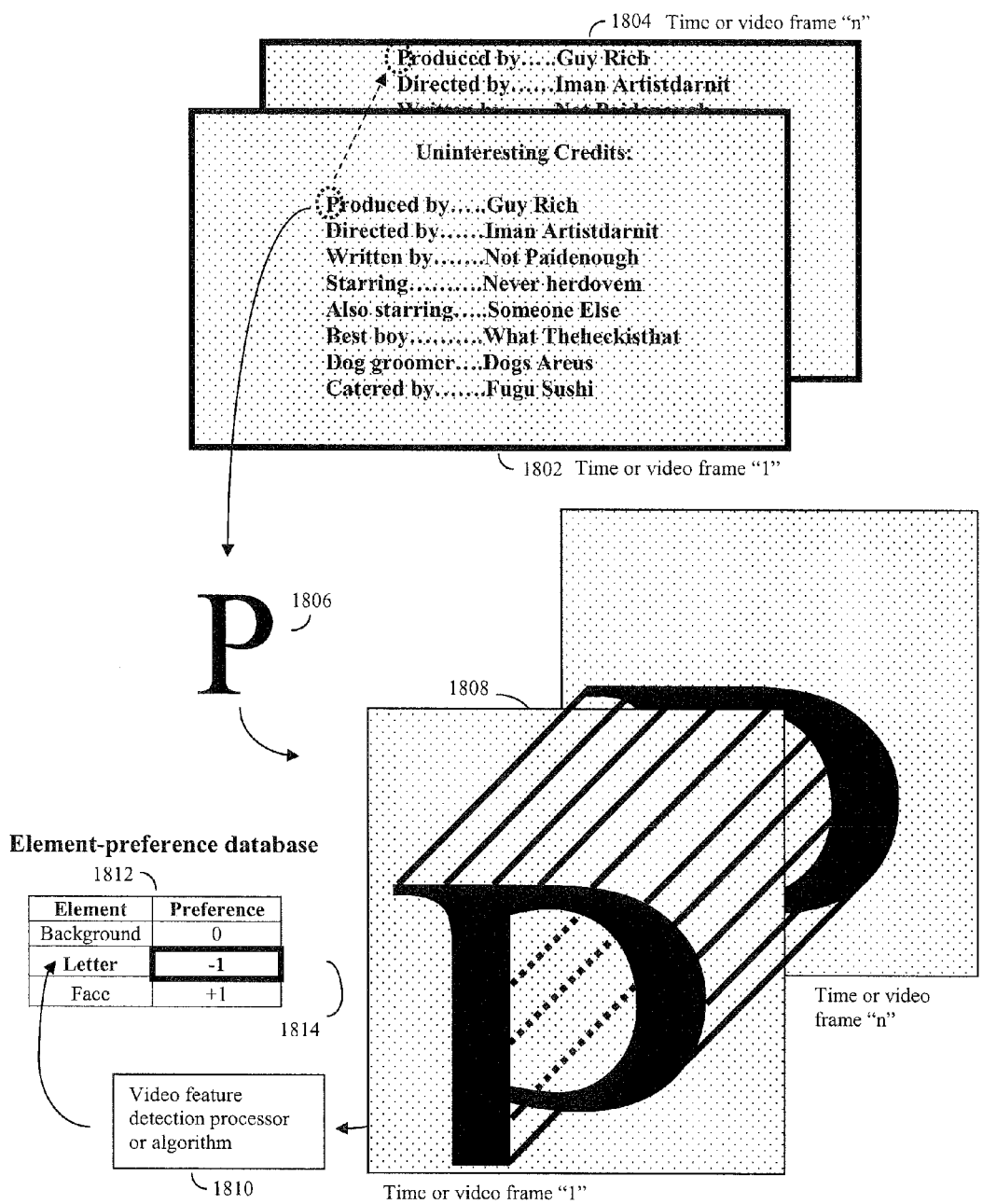
FIG. 18 illustrates how the characteristic text over video pattern of movie credits may generate a low importance rating.

FIG. 18 shows a more detailed view showing how the methods of the invention may be used to detect a large amount of text over video. As previously discussed, large amounts of text over video are statistically correlated with negative viewer preferences because this is usually associated with non-interesting parts of video programs, such as the closing credits.

There are a number of ways to analyze for text over video. One way is to analyze at a somewhat higher level, and look for letter shapes. Another way is to analyze the boundary between the text and non-text portions of the video. Text over video will typically have very sharp transitions. Thus, in this situation, a sharp boundary video element may also have a tendency to be correlated with negative viewer preference.

FIG. 18 shows an example of the first method. In this example, a set of rather uninteresting movie credits (here the example text has been written to emphasize the viewer's lack of interest and preference in this information) are scrolling across the screen. Here the credits start at frame "1" (1802), and by frame "n" have scrolled up, so the credit title is off of the screen, but the remainder of the credits are still on the screen (1804).

In this example, the video may first be analyzed for groups of pixels that move as a unit using the Feldman and Weinshall algorithm, MPEG motion vectors, or other method. This allows the letters to be distinguished from the non-moving background. Here the Feldman and Weinshall algorithm or M PEG motion vectors have been set to track a small enough group of pixels that we may distinguish the group of pixels in the letter "P" in the video credit text "Producer". Further, we may track this "P" group of pixels from video frame 1 (time 1) (1802) to video frame "n" (time n) (1804). Thus with this information, we may distinguish the "tube" formed by the persistent group of pixels "P" (1806). Next, we may analyze this "P tube" (1808) and determine a video element descriptor appropriate to this "P tube" by using a variety of different video feature detection algorithms, such as the methods of Viola and Jones (1810), Chum, or others. Here a Viola and Jones algorithm tuned to recognize letters will indicate that the "P" is most likely a letter.

We may then use this video descriptor as an index to a video element—preference database (1812), and determine the relative viewer preference (in this example, the preference is a negative preference, so the coefficient is set to "−1") (1814) associated with this element. This relative viewer preference is then used as input to the assignment of importance processor or algorithm (240), shown in FIG. 2.

Database and Statistical Methods

As previously discussed, often it may be useful to first pre-screen the video element descriptors, and preferentially use descriptors that were previously selected to have some non-zero (i.e. positive or negative) statistical correlation with user preferences. Generally the more that this statistical correlation deviates from zero, the better the results. This may be done by first creating a relatively large database composed of a plurality of user viewing preferences assembled from a plurality of users and a plurality of videos. This database may then be analyzed versus a large array of potential candidate descriptors. The individual descriptors with the highest statistical correlation with average user viewing preferences are then selected for further analysis.

Database selection: The statistical relationship between a plurality of descriptors and user preferences typically involves an extensive database and various techniques from multivariate statistics. For these purposes, often a relational database may be used. Alternatively a database constructed on a network database models may also be used. Examples of suitable relational databases include structured query language (SQL) databases such as Oracle, DB2, MySQL, PostgreSQL, and the like.

Video Digest Based on Semantic Similarity

In another embodiment of the invention, the system may attempt to determine user viewing preferences at a higher (semantic) level of meaning. Here semantic similarity may be, for example, text-based matching between keywords, or other techniques used in text search.

Imagine a situation where a viewer does not want to see video of guns (1900). Rather than try to tell the system what every possible type of gun looks like, the viewer would much rather just highlight one example of a gun as an example of a negative selection, or type in the word "gun", and have the system automatically populate the database of negative examples (see FIG. 7 (530)) with a variety of different gun video elements.

The text part of the problem is may be solved by a relatively simple process—for example, the user may just explicitly type the word "gun", indicate a negative preference, and the system may sort through a pre-populated reference database of annotated video elements (which does not have any viewing preference associated with the video elements, and hence is a "preference neutral" database), pick out the video elements with a "gun" metadata tag, and use them to populate the database of negative examples.

Figure 19:
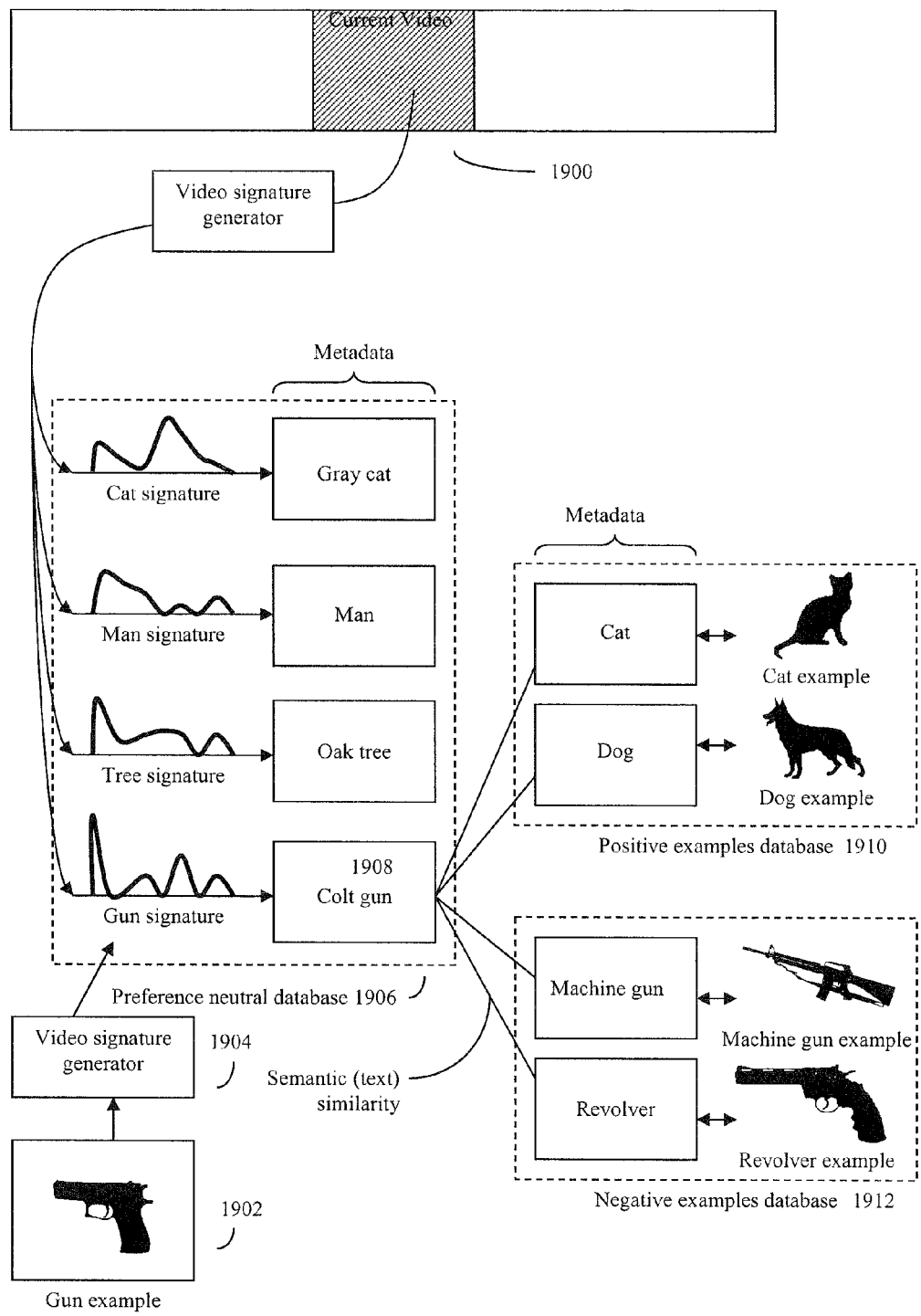
FIG. 19 illustrates a method of automatically populating the persistent database of user preferences with positive and negative examples.

The situation where the user wishes to select a gun image, and have the system automatically populate the database of negative examples with other gun video elements, is somewhat more complex. This is shown in FIG. 19. Here the user viewing a video (1900) may highlight or select an image of a gun on the video image (1902). A video signature generator function (1904) may compute a video signature of the selected gun, and use this as an index to the reference preference neutral database (1906). The system may then use the metadata linked to the "gun" image in the preference neutral database (1908) to retrieve a pointer, text description, or other linking metadata that in turn leads to a database of both positive (1910) and negative (1912) video elements, or else positive and negative images that may be turned into positive and negative video elements. These video elements may then be used to populate the database of positive 7 (520) and negative 7 (530) examples.

Using this technique, the database of positive and negative examples FIG. 7 (520), (530), may be populated with a larger number of samples by implicit (low user effort) and explicit (some user effort required) methods.

In the explicit way, the user explicitly specifies examples of content or the metadata describing them that he would like or would not like to see. For example, if the user does not want to see guns, he may add the word "gun" to the list of negative examples. Alternatively, the user may provide an image of a gun as a negative example. The image in this case will be matched to the neutral database and the matching metadata "Colt gun" will be retrieved. The gun example together with the associated metadata will be added to the negative database.

In the implicit way, the history of user behavior is used to automatically generate positive and negative examples. For example, if the user skipped a scene where the gun has appeared, it will be regarded as a negative example. This example will be matched to the neutral database and the matching metadata "Colt gun" will be retrieved. The example+the metadata will be added to the negative database.

Alternatively, it is possible to use entire temporal intervals (sequences of frames) of video and compute their similarity using "Video DNA"—a method for spatiotemporal matching of different video sequences that is inspired by the bioinformatics computational methods used for matching different DNA sequences. This method is described below.

Use with Direct (Overall) Viewer Interest Annotation Data

In an alternative embodiment of the invention, the importance rating of a portion of the video may be computed by comparing the portion to a set of annotated (rated) portions of video rather than computing and aggregating local rating based on element-wise visual similarity. In other words, the visual similarity may be computed directly on video aggregates rather than on video elements.

In one of the embodiments, the visual similarity may be computed by matching a signature or "fingerprint" generated from a spatial interval of a video content. The signature may be thought of as a unique identification number of that portion of the video.

Here, the various video clips may be processed to create the corresponding video signatures. These signatures may uniquely (i.e. to a high degree of statistical certainty) identify the various video clips, much as a fingerprint uniquely identifies a unique human individual. Here the signature identifies the video clip as a whole entire unit. These signatures may then be stored in a video signatures database, along with metadata, including information such as genre, content type, etc., which may be used in determining the content rating and viewer preference rating.

User overall preference data may again be obtained through the system observing user interactions, and making inferences. For example, if a use has a tendency to skip past a certain type of commercial, and does so more than a certain number of times, the system may associate the video signature of the various video clips in the commercial with negative user preferences, and always skip past repeated versions of this commercial that may have the same video signature.

Thus by using this video signature database, a DVR running the system of the invention could supplement the accuracy of its automated user preference process by also continually making video signatures of the various video portions, noting overall user preference, and storing this overall preference in the video signature database. When another video was played, the system could again compute video signatures, retrieve overall user preferences from the video signature preference database, and use this information to also help control video digest process.

These overall user preferences, once retrieved from the video signature database, may be set to override the preference rating that would otherwise be automatically assigned by the video digest video element preference database. Alternatively, the overall user preferences may simply be given a weighing factor and a vote, and be considered as yet another factor, along with the estimated user preference automatically assigned by the video digest video element preference database, in determining overall user preference. In general, the two inputs (overall user preferences and video element preference) may be combined by use of a master user preference function, and the output from this master function may be used to control the operation of the video digest generator, DVR, etc.

In yet another embodiment, the subsystem that computes the video element preferences may be selectively deweighted, turned out, or removed altogether, and the system and system may function with just the overall user preference output.

Many different algorithms and methods may be used to create video signatures. One of the simplest methods is to create a hash functions of the various video clips I(x, y, t). Here a hash function may be essentially any mathematical function or process that turns a larger amount of data into a relatively small integer.

If a hash function method of video signature generation is chosen, the hash function used should be robust. In this case, robust means insensitive to noise and distortions (change in resolution, cropping, etc.) in the video. For example, the hash function should ideally reliably detect I(x, y, t) video clips from the same commercial that has been compressed to different amounts, and run in different digital video formats (i.e. 480p, 720p, 1080i, 1080p, etc.). Generally the more robust the video signature is (that is, returning the same or similar signatures from video even under conditions of noise, distortion, etc.), the better. Here, the hash function method may be more robust to changes in format and compression by down converting the video signal to standard lower resolution, and applying a standard amount of compression before computing the hash function. Other algorithms and methods of video signature generation other than hash functions may also be used.

Other Algorithms:

One method that may be particularly useful for identifying visual similarity between different segments of video is a robust type of video signature generation process termed "video DNA". Video DNA is a method for spatiotemporal matching of different video sequences that is inspired by the bioinformatics computational methods used for matching different DNA sequences. Here, different video media video clips may be mathematically mapped into an ordered sequence of "visual nucleotides" by analyzing a series of time successive multi-frame video images for visual features and feature descriptors, pruning the features to remove features that are only present on one video image, time averaging the remaining video features, discarding outlier features from the average, using a nearest neighbor fit to assign the remaining features to a standardized array of different features, and counting the number of each type of assigned feature, producing a "video nucleotide" for each series of video frames. The "video nucleotides" for each series of video frames may then be assembled into a sequence, called "video DNA" that describes the larger video. The "video DNA" from different video sources may then be compared using a generalized distance function to score for matches between different video nucleotides, and using bioinformatics-like comparison algorithms inspired by DNA sequence matching techniques.

The video DNA method is "robust" to noise and distortions in the video signal because it is based on feature detectors and feature descriptors that are themselves robust to these factors.

More specifically, the Video DNA method works by determining spatio-temporal correspondence between different sets of video data. This may be done by creating a sequence of "visual nucleotides" by analyzing a series of time successive video images from the video data for features using robust feature detectors such as Harris-Laplace corner detectors, affine-invariant Harris-Laplace corner detectors, Harris-Laplace corner detectors, spatio-temporal corner detectors or a MSER algorithm. These features are then pruned to remove those features that are only present on one video image. The pruned features are then described using robust feature descriptors such as scale invariant feature transform (SIFT) descriptors, spatio-temporal SIFT descriptors, or speed up robust features (SURF) descriptors, where a descriptor is associated with each feature. These descriptors may optionally be time averaged across multiple video frames, and for each feature, an average descriptor (with outliers trimmed or ignored) may be used. These pruned and time-averaged feature descriptors may then be assigned, using a nearest neighbor fit, to the most similar feature descriptor selected from a standardized array of different feature descriptors.

The number of each type of assigned feature descriptor in the series of time successive video images is then counted. This counting process creates coefficients for the standardized array of different features. The result of this process, called a "visual nucleotide", may uniquely assign robust signatures to short segments of video that are remarkably robust to changes in video resolution, differences in video size, and other common video distortion, and thus represent an excellent way of uniquely identifying short segments of video.

Although the invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations may be made in the number and arrangement of components illustrated in the above Figures. It is intended that the scope of the appended claims include such changes and modifications.

The invention claimed is:

1. A digital video recorder system for storage and/or playback of video media content, said video media content comprising audio portions and video image portions, said recorder comprising:

29 at least one video processor capable of analyzing at least the video image portions of said input media content and automatically generating descriptors that are associated with the video image and/or audio contents of various time portions of the input media content;

at least one sensor to detect and record user viewing preferences while the input media content is being played;

persistent memory capable of storing a persistent database that correlates the descriptors with the recorded user viewing preferences;

at least one control processor, and associated control software; in which the control processor, under the control of the control software, controls the storage and/or playback of unknown media content comprising various time portions of a previously unanalyzed input media content by:

a) sending the unknown media content to the video processor, and directing the video processor to generate unknown video descriptors comprising descriptors of the video and or audio portion of various time portions of the unknown media content;

b) retrieving the user viewing preferences associated with the unknown video descriptors by using the unknown video descriptors as an index to the persistent database;

c) constructing an estimated user preference of the various time portions of the unknown media content by using the retrieved user viewing preferences and a suitable weighing function;

d) generating overall video identifiers comprising video signatures of the various time portions of the unknown media content;

e) retrieving the overall user viewing preferences associated with the overall video identifiers by using the overall video identifiers as an index to the persistent database, and;

f) inputting the overall user viewing preferences and the estimated user preference into a master user preference function; and g) controlling the storage and playback of various time portions of the unknown media content with this master user preference function.

2. The system of claim 1, in which the video processor and the control processor are the same processor and the video processor is capable of compressing and/or decompressing a lossy or lossless video codec.

3. The system of claim 1, in which the video processor and the control processor are different processors, and in which the video processor is optimized for generating the descriptors.

4. The system of claim 1, in which the descriptors are selected from a population of descriptors known to have a positive or negative statistical correlation with user preferences.

5. The system of claim 4, in which the descriptors that are associated with the image contents of various time portions of the input media content are the result of applying mathematical processing to a subset of media content selected from the group consisting of three dimensional blocks of pixels, three dimensional edges, spatio-temporal regions with consistent motion, a priori objects, and collections of simple features.

6. The system of claim 4, in which the descriptors that are associated with the image contents of various time portions of the input media content are further optimized to detect action, conversation, cartoons, outdoor scenes, and text over video.

7. The system of claim 1, in which the descriptors that are associated with the audio contents of various portions of the input media content are the result of applying mathematical processing to a subset of media content selected from the group consisting of functions that analyze sound frequency range, sound energy versus frequency range, voice frequency range, music frequency range, word recognition, and language recognition.

8. The system of claim 1, in which the database contains both descriptors associated with positive viewer preference, and descriptors associated with negative viewer preference, and the suitable weighting function contains a subtraction operation that subtracts the negative viewer preference from the positive viewer preference.

9. The system of claim 1, in which the system memory and/or database may be supplemented with a supplemental database of other video descriptors and user preferences obtained from a plurality of other systems, other media content, and other users.

10. The system of claim 1, in which the one or more sensors to detect and record user viewing preferences detect information selected from the group consisting of:

video that the user plays at normal speed, video that the user skips past, video that the user plays at high speed, video that the user designates as preferred, video that the user designates as not preferred, video that image sensors on the system indicate is playing to an audience, video that image sensors indicate is not playing to an audience, video that image and sound sensors indicate is playing to an interested audience, and video that image and sound sensors indicate is playing to a non-interested audience.

11. The system of claim 1, in which the system compresses video to fit within a designated time duration that is shorter than the length of the video by choosing the input video time portions associated with the highest user preference, and not choosing the input video time portions associated with lower user preference, so as to cause the input video to be played back within the designated time duration.

12. The system of claim 1, in which the descriptors that are associated with the image contents of various time portions of the input media content are produced from image feature recognition algorithms selected from the group consisting of the Viola-Jones algorithm, the Rowley-Baluja-Kanade algorithm, the Schneiderman-Kanade algorithm, the Roth-Yang-Ahuja algorithm, and the Chum algorithm.

13. The system of claim 1, in which the database is a relational database.

14. The system of claim 1, in which the system is capable of distinguishing between different users, and the associated control software controls a media content based upon an individual user's profile of viewing preferences or history of viewing preferences.

15. The system of claim 1, in which the video signature is computed by a hash function or video DNA creation algorithm.

16. The system of claim 1, in which the master user preference function allows the overall user viewing preference to override the estimated user preference.

17. A digital video recorder device for storage and playback of video media content, said video media content comprising audio portions and video image portions, said recorder comprising:

at least one video processor capable of analyzing at least the video image portions of said input media content and automatically generating descriptors that are associated with the video image and audio contents of various time portions of the input media content;

at least one sensor to detect and record user viewing preferences while the input media content is being played;

persistent memory capable of storing a persistent database that correlates the descriptors with the recorded user viewing preferences; at least one control processor and associated operational software;

in which the control processor, under the control of the control software, is configured to controls the storage and playback of unknown media content comprising various time portions of a previously unanalyzed input media content, the processor including a descriptor generator configured to receive the unknown media content and to generate unknown video descriptors comprising descriptors of the video and or audio portion of various time portions of the unknown media content;

an index unit configured to utilize the unknown video descriptors as an index to the persistent database to retrieve user viewing preferences associated with the unknown video descriptors;

a preference constructor configured to construct an estimated user preference of the various time portions of the unknown media content by using the retrieved user viewing preferences and a suitable weighing function;

wherein the processor is further configured to utilize this estimated user preference to control the storage and/or playback of various time portions of the unknown media content;

in which said at least one video processor or control processor is further configured to compute one or more video signatures that identify overall video identifiers comprising the overall appearance of the various time portions of the unknown media content;

said at least one video processor or control processor is further configured to correlate these overall video identifiers with overall user viewing preferences, and also to store this data in the persistent database;

in which said at least one video processor or control processor, under control of the control software, are further configured to control the storage and/or playback of unknown media content comprising various time portions of a previously unanalyzed input media content by a signature generator configured to generate overall video identifiers comprising video signatures of the various time portions of the unknown media content;

a signature indexer configured to use the overall video identifiers as an index to the persistent database, and retrieve the overall user viewing preferences associated with the overall video identifiers;

a signature preference constructor configured to use the overall user viewing preferences and the estimated user preference as input into a master user preference control unit;

wherein said master user preference control unit is further configured to control the storage and/or playback of various time portions of the unknown media content.

18. The device of claim 17, in which the video processor implements one or more lossy or lossless codecs selected from the group consisting of MPEG-1, MPEG-2, MPEG-4, MPEG-10, MPEG-4 (Advanced Simple Profile), H.264, Blackbird, Cinepak, Indeo 3/4/5, MJPEG, Sorenson 3, Microsoft Windows Media Video (WMV), RealVideo, CorePNG, Huffyuv, Lagarith, LCL, SheerVideo, Lossy codecs, or lossless codecs.

19. The device of claim 18, in which the video processor and the control processor are the same processor.

20. The device of claim 17, in which one or more of the descriptor generator, the index unit, or the preference constructor are implemented by software running on the video or control processor, software embedded into the video or control processor, dedicated hardware processor circuitry embedded into the video or control processor, or dedicated hardware circuitry located outside the video or control processor.

21. The device of claim 17, in which the video signature is computed by a hash function or video DNA creation algorithm.

22. The device of claim 17, in which the persistent database that correlates the descriptors with the recorded user viewing preferences contains example data selected from a user-viewing-preference-neutral database of descriptors.

23. A computerized method of controlling the storage and/or playback of video media content said video media content comprising audio portions and video image portions, comprising:

inputting a plurality of different video media contents, and using at least one processor to perform the steps of:

automatically generating a plurality of descriptors that are associated with the video image portions and/or audio portions contents of various time portions of the media content; and detecting and recording the user viewing preferences associated with these various time portions of the different media contents;

correlating the descriptors with the user video viewing preferences in a persistent database so that the descriptors may be used as an index to the persistent database to retrieve user video viewing preferences; and using this database to control the storage and/or playback of unknown media content comprising a previously unrated media content by:

automatically generating unknown content descriptors comprising a plurality of descriptors that are associated with the unknown media content;

using the unknown content descriptors as an index into the database; retrieving the user viewing preferences;

constructing an estimated user preference of the various time portions of the unknown media content by using the retrieved user viewing preferences and a suitable weighing function; and controlling the storage and/or playback of the unknown media content based on said estimated user preference;

wherein the persistent database that correlates the descriptors with the recorded user viewing preferences is supplemented with additional descriptors from a user viewing preference neutral database of descriptors.

24. The method of claim 23, in which the descriptors are selected from a population of descriptors known to have a positive or negative statistical correlation with user preferences.

25. The method of claim 23, in which the descriptors that are associated with the image contents of various time portions of the input media content are the outputs of mathematical functions selected from the group consisting of three dimensional blocks of pixels, three dimensional edges, spatio-temporal regions with consistent motion, a priori objects, and collections of simple features.

26. The method of claim 25, in which the descriptors that are associated with the image contents of various time portions of the input media content are further optimized to detect action, conversation, cartoons, outdoor scenes, and text over video.

27. The method of claim 23, in which the descriptors that are associated with the audio contents of various portions of the input media content are the outputs of mathematical functions selected from the group consisting of functions that analyze sound frequency range, sound energy versus frequency range, voice frequency range, music frequency range, word recognition, and language recognition.

28. The method of claim 23, in which the database contains both descriptors associated with positive viewer preference, and descriptors associated with negative viewer preference, and the suitable weighting function contains a subtraction operation that subtracts the negative viewer preference from the positive viewer preference.

29. The method of claim 23, in which the database may be supplemented with a supplemental database of other video descriptors and user preferences obtained from a plurality of other media content, and other users.

30. The method of claim 23, in which the user viewing preferences are selected from the group consisting of: video that the user plays at normal speed, video that the user skips past, video that the user plays at high speed, video that the user designates as preferred, video that the user designates as not preferred, video that is playing to an audience, video that is not playing to an audience, video that is playing to an interested audience, and video that playing to a non-interested audience.

31. The method of claim 23, further compressing video to fit within a designated time duration that is shorter than the length of the video by choosing the input video time portions associated with the higher estimated user preference, and not choosing the input video time portions associated with lower estimated user preference, so as to cause the input video to be played back within the designated time duration.

32. The method of claim 23, in which the database is a relational database.

33. The method of claim 23, in which the additional descriptors are selected based on a matching function between user selected metadata and additional descriptor metadata.

34. The method of claim 33, in which the user selected metadata is generated by computing the selected video signature of video images selected by the viewer, using the selected video signature as an index to a preference neutral database, retrieving database linked metadata, and using the database linked metadata to retrieve the additional descriptors.

35. The method of claim 23, further comprising:
  computing one or more overall video identifiers comprising video signatures that identify the overall appearance of the various time portions of the unknown media content;
  correlating these overall video identifiers with overall user viewing preferences, and also storing this data in the persistent database;
  and controlling the storage and/or playback of unknown media content comprising various time portions of a previously unanalyzed input media content by:
  d) generating overall video identifiers comprising video signatures of the various time portions of the unknown media content;
  e) retrieving the overall user viewing preferences associated with the overall video identifiers by using the overall video identifiers as an index to the persistent database;
  f) inputting the overall user viewing preferences and the estimated user preference into a master user preference function;
  g) and controlling the storage and/or playback of various time portions of the unknown media content based on said master user preference function.

36. The method of claim 35, in which the video signature is computed by a hash function, video DNA creation algorithm, or other mathematical algorithm.

37. The method of claim 35, in which the master user preference function allows the overall user viewing preference to override the estimated user preference.

38. A computerized method of controlling the storage and/or playback of video media content said video media content comprising audio portions and video image portions, said method comprising:
  inputting a plurality of different media contents, and using at least one processor to perform the steps of:
  automatically generating a plurality of descriptors that are associated with the video image portions and/or audio portion contents of various time portions of the media content;
  said descriptors being selected from population of descriptors known to have a positive or negative statistical correlation with user preferences;
  said descriptors being the outputs of mathematical functions selected from the group consisting of three dimensional blocks of pixels, three dimensional edges, spatiotemporal regions with consistent motion, a priori objects, and collections of simple features;
  or said descriptors being the outputs of mathematical functions selected from the group consisting of functions that analyze sound frequency range, sound energy versus frequency range, voice frequency range, music frequency range, word recognition, and language recognition;
  and detecting and recording the user viewing preferences associated with these various time portions of the different media contents;
  correlating the descriptors with the user video viewing preferences in a persistent database so that the descriptors may be used as an index to the persistent database to retrieve user video viewing preferences;
  and controlling the storage and/or playback of an unknown media content comprising previously unrated media content with said persistent database by:
  automatically generating a plurality of unknown content descriptors comprising descriptors that are associated with the unknown media content;
  database indexing the database with the unknown content descriptors;
  retrieving the user viewing preferences;
  constructing an estimated user preference of the various time portions of the unknown media content by using the retrieved user viewing preferences and a suitable weighing function; and controlling the storage and/or playback of the unknown media content by further;
  computing one or more overall video identifiers comprising video signatures that identify the overall appearance of the various time portions of the unknown media;
  correlating these overall video identifiers with overall user viewing preferences, and also storing this data in the persistent database;
  controlling the storage and/or playback of unknown media content comprising various time portions of a previously unanalyzed input media content by:
  a) generating overall video identifiers comprising video signatures of the various time portions of the unknown media content;
  b) retrieving the overall user viewing preferences associated with the overall video identifiers by using the overall video identifiers as an index to the persistent database;

c) inputting the overall user viewing preferences and the estimated user preference into a master user preference function;

d) and controlling the storage and playback of various time portions of the unknown media content with this master user preference function.

39. The method of claim 38, in which the descriptors that are associated with the image contents of various time portions of the input media content are further optimized to detect action, conversation, cartoons, outdoor scenes, and text over video.

40. The method of claim 38, in which the database contains both descriptors associated with positive viewer preference, and descriptors associated with negative viewer preference, and the suitable weighting function contains a subtraction operation that subtracts the negative viewer preference from the positive viewer preference.

41. The method of claim 38, in which the database may be supplemented with a supplemental database of other video descriptors and user preferences obtained from a plurality of other media content, and other users.

42. The method of claim 38, in which the user viewing preferences are selected from the group consisting of: video that the user plays at normal speed, video that the user skips past, video that the user plays at high speed, video that the user designates as preferred, video that the user designates as not preferred, video that is playing to an audience, video that is not playing to an audience, video that is playing to an interested audience, and video that playing to a non-interested audience.

43. The method of claim 38, further compressing video to fit within a designated time duration that is shorter than the length of the video by choosing the input video time portions associated with the higher estimated user preference, and not choosing the input video time portions associated with lower estimated user preference, so as to cause the input video to be played back within the designated time duration.

44. The method of claim 38, in which the database is a relational database.

45. The method of claim 38, in which the persistent database that correlates the descriptors with the recorded user viewing preferences is supplemented with additional descriptors selected from a user viewing preference neutral database of descriptors.

46. The method of claim 38, in which the additional descriptors are selected based on a matching function between user selected metadata and additional descriptor metadata.

47. The method of claim 38, in which the user selected metadata is generated by computing the selected video signature of video images selected by the viewer, using the selected video signature as an index to a preference neutral database, retrieving database linked metadata, and using the database linked metadata to retrieve the additional descriptors.

48. The method of claim 38, in which the video signature is computed by a hash function, video DNA creation algorithm, or other mathematical algorithm.

49. The method of claim 38, in which the master user preference function allows the overall user viewing preference to override the estimated user preference.

* * * * *